United States Patent
Nelakanti et al.

(10) Patent No.: US 6,993,359 B1
(45) Date of Patent: *Jan. 31, 2006

(54) METHOD AND APPARATUS FOR INTER-CELL HANDOVER IN WIRELESS NETWORKS USING MULTIPLE PROTOCOLS

(75) Inventors: Bhavannarayana Sri Nrusimha Nelakanti, San Jose, CA (US); Ian Leslie Sayers, Redwood City, CA (US); Paul Jan Long, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/561,100

(22) Filed: Apr. 28, 2000

(51) Int. Cl.
*H04B 1/38* (2006.01)

(52) U.S. Cl. .............................. 455/554.1; 455/426.1; 455/461

(58) Field of Classification Search ............. 455/554.1, 455/555, 426.1, 461, 433, 445, 436, 437, 455/438, 439, 440, 442, 552.1, 554.2; 379/156, 379/157, 161, 167.01; 370/331
See application file for complete search history.

(56) References Cited

U.S. PATENT DOCUMENTS

| | | | | |
|---|---|---|---|---|
| 5,602,843 A | | 2/1997 | Gray | ........................ 370/338 |
| 5,771,275 A | * | 6/1998 | Brunner et al. | ............. 370/385 |
| 5,796,729 A | | 8/1998 | Greaney et al. | ............ 370/345 |
| 5,970,059 A | * | 10/1999 | Ahopelto et al. | ........... 370/338 |
| 5,978,679 A | * | 11/1999 | Agre | .......................... 455/442 |
| 6,112,088 A | * | 8/2000 | Haartsen | ..................... 455/437 |
| 6,185,288 B1 | * | 2/2001 | Wong | ......................... 379/219 |
| 6,223,055 B1 | * | 4/2001 | Cyr | ............................ 455/555 |
| 6,226,515 B1 | * | 5/2001 | Pauli et al. | ............. 455/426.1 |
| 6,256,612 B1 | * | 7/2001 | Vo et al. | ..................... 704/500 |
| 6,359,880 B1 | * | 3/2002 | Curry et al. | ................ 370/352 |
| 6,424,638 B1 | * | 7/2002 | Ray et al. | ................... 370/331 |
| 6,526,033 B1 | * | 2/2003 | Wang et al. | ................ 370/338 |

FOREIGN PATENT DOCUMENTS

EP  0 766 427 A2  2/1997

* cited by examiner

*Primary Examiner*—Tilahun Gesesse
(74) *Attorney, Agent, or Firm*—Hamilton, Brook, Smith & Reynolds, P.C.

(57) ABSTRACT

A communication system formed by a private wireless network that can be used with public wireless networks using a public wireless protocol, such as GSM, and typically includes public networks, such as PSTN, ISDN and the Internet, using a wired-packet protocol, such as IP. The private network also typically includes a local area network (LAN) and the private network typically connects to the public networks using the wired-packet protocol, such as IP. The public and private wireless networks operate with the same public wireless protocol, such as GSM, and the private wireless network additionally operates with the wired-packet protocol, such as IP. In this environment, multiple wireless cells are present and inter-cell handovers employ multiple protocols including the wired-packet protocol.

84 Claims, 28 Drawing Sheets

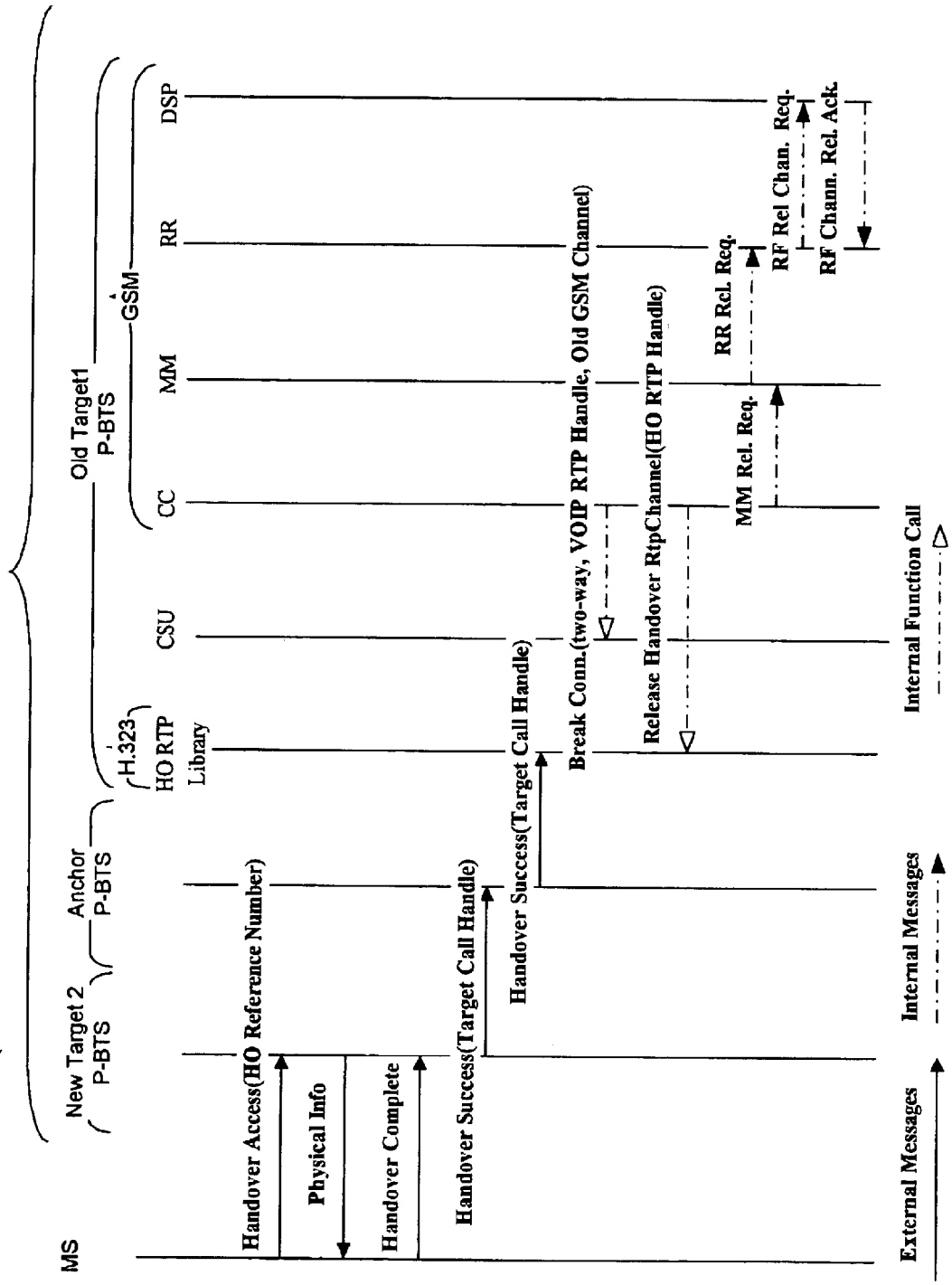
FIG. 29 (see FIG. 23)

METHOD AND APPARATUS FOR INTER-CELL HANDOVER IN WIRELESS NETWORKS USING MULTIPLE PROTOCOLS

CROSS REFERENCE

Title: METHOD AND APPARATUS FOR INTEGRATED WIRELESS COMMUNICATIONS IN PRIVATE AND PUBLIC NETWORK ENVIRONMENTS Inventors: Ian Leslie Sayers, Paul Jan Long, Sheausong Yang Application SC/File Ser. No. 09/188,856, now U.S. Pat. No. 6,539,237

Filing Date: Nov. 9, 1998

BACKGROUND OF THE INVENTION

The present invention relates to a method and apparatus that provides for wireless calls in private network environments and in public network environments. More particularly, this invention relates to inter-cell handover in wireless networks.

Conventional Cellular Systems

Present day cellular mobile telephone systems provide for a large and increasing demand for mobile services. Cellular systems "reuse" frequency within a group of cells to provide wireless two-way radio frequency (RF) communication to large numbers of users. Each cell covers a small geographic area and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The switches provide for the handover of users from cell to cell and thus typically from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

The base station in addition to providing RF connectivity to users also provides connectivity to a Mobile Services Switching Center (MSC). In a typical cellular system, one or more MSCs will be used over the covered region. Each MSC can service a number of base stations and associated cells in the cellular system and supports switching operations for routing calls between other systems (such as the PSTN) and the cellular system or for routing calls within the cellular system.

Base stations are typically controlled from the MSC by means of a Base Station Controller (BSC). The BSC assigns RF carriers to support calls, coordinates the handover of mobile users between base stations, and monitors and reports on the status of base stations. The number of base stations controlled by a single MSC depends upon the traffic at each base station, the cost of interconnection between the MSC and the base stations, the topology of the service area and other similar factors.

A handover between base stations occurs, for example, when a mobile user travels from a first cell to an adjacent second cell. Handovers also occur to relieve the load on a base station that has exhausted its traffic-carrying capacity or where poor quality communication is occurring. The handover is a communication transfer for a particular user from the base station for the first cell to the base station for the second cell. During the handover in conventional cellular systems, there may be a transfer period of time during which the forward and reverse communications to the mobile user are severed with the base station for the first cell and are not established with the second cell.

In time division multiple access (TDMA) systems, multiple channels are defined using the same carrier. The separate channels each transmit discontinuously in bursts which are timed so as not to interfere with the other channels on that carrier. Typically, TDMA implementations also employ FDMA techniques. Carriers are reused from cell to cell in an FDMA scheme, and on each carrier, several channels are defined using TDMA methods. The Global System for Mobile Communications (GSM), PCS 1900, IS-136, and PDC standards are examples of TDMA methods in current use.

The present specification uses a GSM system for purposes of explanation but the present invention applies to any wireless system protocol.

GSM Cellular Systems

The GSM system architecture is described, for example, in detail by M. Mouly and M.-B. Pautet, The GSM System for Mobile Communications, 1992 and Mouly and M.-B. Pautet, *GSM Protocol Architecture: Radio Sub-system Signaling*, IEEE 41st Vehicular Technology Conference, 1991. The following sections highlight some unique aspects of GSM systems.

The GSM system provides many advanced services, including: ISDN compatible supplementary services; Global roaming among GSM networks and other network types; advanced packet data services. The term ISDN includes narrow band (N-ISDN) and broad band (B-ISDN) where B-ISDN encompasses ATM and Frame Relay.

GSM System Architecture

There is a very comprehensive set of GSM Specifications which define the three major components of any GSM network, namely, the Mobile Station (MS), Base Station Sub-System (BSS) and the Network Sub-System (NSS).

Base Station Subsystem (BSS)

The Base Station Subsystem (BSS) is subdivided into two main entities, the Base Transceiver Station (BTS) and the Base Station Controller (BSC). The BTS includes the radio transceivers that define the radio cell and supports the radio (Um) interface link to the mobile station. The BTS further supports the defined channel coding, encryption and speech coding functions. The BTS interfaces to the BSC via the Abis-interface.

The Base Station Controller (BSC) manages the radio resources of multiple BTSs. The BSC controls all of the functions related to the radio network, including the allocation and release of radio resources and control of radio interface handovers. The BSC interfaces to the MSC via the A-interface.

Network Subsystem

The network subsystem (NSS) comprises four components these are, the Mobile Services Switching Center (MSC), Home Location Register (HLR), Visitor Location Register (VLR), Authentication Center (AUC) and the Equipment Identity Register (EIR).

The main part of the network subsystem (NSS) is provided by the Mobile Services Switching Center (MSC). The MSC provides the ability to track the mobile user, switch calls to/from the user to the PSTN/ISDN/PLMN (public land mobile network) and maintain contact with the mobile user via radio handovers.

The GSM PLMN (GSM public land mobile network) contains two database functions related to the mobility of the user these are the Home Location Register (HLR) and the Visited Location Register (VLR).

The Home Location Register (HLR) is used by the operator to maintain data on all their subscribers. The subscriber data includes both fixed data, such as International Mobile Subscriber Identity (IMSI), subscriber MSISDN number and selected supplementary services, and dynamic data such as whereabouts of the mobile user and current settings for any supplementary services. Whenever a mobile users roams into a new Visitor Location Register (VLR) area the HLR downloads the subscriber data to the VLR The HLR is also required to deal with mobile terminating calls by routing the call to the correct VLR for further processing.

The Visitor Location Register (VLR) is used as a local cache to store the subscriber data near the current location of the mobile user. Once the VLR has downloaded the subscriber data the mobile user can begin to use the services provided by the network. The process of downloading the user data and establishing a presence in a particular location is called roaming.

In order to prevent fraudulent use of the network, the GSM PLMN also contains two further databases the Authentication Center (AUC) and the Equipment Identity Register (EIR).

The Authentication Center (AUC) is a maintained in a secure environment since it contains the network authentication algorithms. The network uses this database to obtain data that is used to "challenge" the mobile user when they make an access to the network. The AUC uses two algorithms known as A3 and A8, which are also stored in the Subscriber Identity Module (SIM) of the user. The A3 algorithm is used to authenticate the user by the familiar challenge response mechanism. The A8 algorithm is used to generate the required key for the radio interface encryption algorithm know as A5. Generally the A3 and A8 algorithms are developed by the network operators.

The Equipment Identity Register (EIR) contains a list of all the valid International Mobile Equipment Identity (IMEI) values. Using the unique IMEI value associated with all mobiles it is possible to restrict the use of specific mobiles. This database is used to prevent the use of stolen or misbehaving mobile stations.

Operations and Maintenance

Associated with the BSS and NSS equipment are Operations and Maintenance Centers, OMC-R and OMC-S, respectively. The OMC-R and OMC-S provide the following standard operations and maintenance control functions for the GSM BSS and NSS:

Configuration Management
Fault management
Test Management
Performance Management
Security Management
Account Management Other functions may be available depending upon the BSS or NSS manufacturer. In addition, the OMC-S may also be required to perform database or user management functions on the HLR and VLR.

Basic Services Provided by GSM

GSM was designed to be a feature rich mobile services with most services based upon ISDN principles. In basic terms the GSM provides a basic set of services which can be enhanced by the use of supplementary services. The Basic Services include:

Speech, the most basic service
Short Message, a two way messaging service
Group 3 FAX, this services allows connection to Group 3 FAX machines
Cell Broadcast, this service allows messages to be broadcast to the mobile stations.

The Bearer Services include:

Asynchronous Data 300–14400 bps, allows access to normal V-Series Modems
Synchronous Data 300–14400 bps, allows access to CSP-DNs
General Packet Radio Services 9600–170000 bps, a packet services allowing seamless access to the internet.

The following GSM supplementary services are currently available:

Call Forwarding
Call Barring Services
Call Transfer
Conference Calling
Call Wait and Call Hold
Calling Line Identification
Call Completion to a Busy Subscriber In private wireless networks, Mobile station access the network through the private base stations (P-BTS) using standard GSM protocols in the same way as they access the public wireless networks. But these private base stations are directly connected to a private LAN and employ Voice over IP technologies such as H.323 to route calls among Mobile station and between Mobile station and other PSTN and PBX terminals. In such private networks, typical inter-cell handover methods in a traditional public GSM network cannot be employed for handovers among private cells. Also, handovers between private cells and public cells requires new techniques for communication and handling between the MAP signaling based public cellular networks and voice over IP (VoIP) signaling based private cellular networks.

In accordance with the above background, it is the object of the present invention to provide wireless systems having the capability to have handover among cells in public and private networks.

SUMMARY OF THE INVENTION

The present invention is a communication system formed by a private wireless network that can be used with public wireless networks using a public wireless protocol, such as GSM, and typically includes public networks, such as PSTN, ISDN and the Internet, using a wired-packet protocol, such as IP. The private network also typically includes a local area network (LAN) and the private network typically connects to the public networks using a wired-packet protocol, such as IP.

In the present invention, the public and private wireless networks operate with the same public wireless protocol, such as GSM, and the private wireless network additionally operates with a wired-packet protocol, such as IP. In this environment, multiple wireless cells are present and inter-cell handovers employ multiple protocols including the wired-packet protocol.

The private wireless network uses private base stations (P-BTS) which include software for a wireless protocol, such as GSM, and include software for private network operation with a wired protocol, such as IP.

The communication system permits users to operate freely in both public and private wireless networks using standard mobile stations while achieving high private network data rates. The communication system typically uses normal wireless handsets or other mobile or fixed stations without need for any modifications.

The private base stations (P-BTS) in one embodiment are directly connected to a private LAN and thereby enable standard wireless stations to make and receive calls over the LAN. Also, the range of calls, using standard Internet protocols, extends between LANs and between different corporations over the Internet without requiring the support of a switch (e.g. MSC). The wireless stations can freely roam between the public wireless network and the private wireless network and a single telephone number can be assigned to a mobile station for use in both the public and the private wireless networks.

P-BTSs along with one or more gatekeepers and one or more gateways and a PLMN signaling Interworking Unit (IWU) together provide the same level of functionality to GSM Mobile station as does a GSM public wireless network (that includes a Network Subsystem and one or more Base Station Subsystems).

The foregoing and other objects, features and advantages of the invention will be apparent from the following detailed description in conjunction with the drawings.

BRIEF DESCRIPTION OF THE DRAWINGS

FIG. 29 depicts a continuation of the target P-BTS handover to third internal call flows where the initial internal call flows for the target P-BTS are the same as the handback call flows of FIG. 23 (Target1-to-Target2).

DETAILED DESCRIPTION

Figure 1:
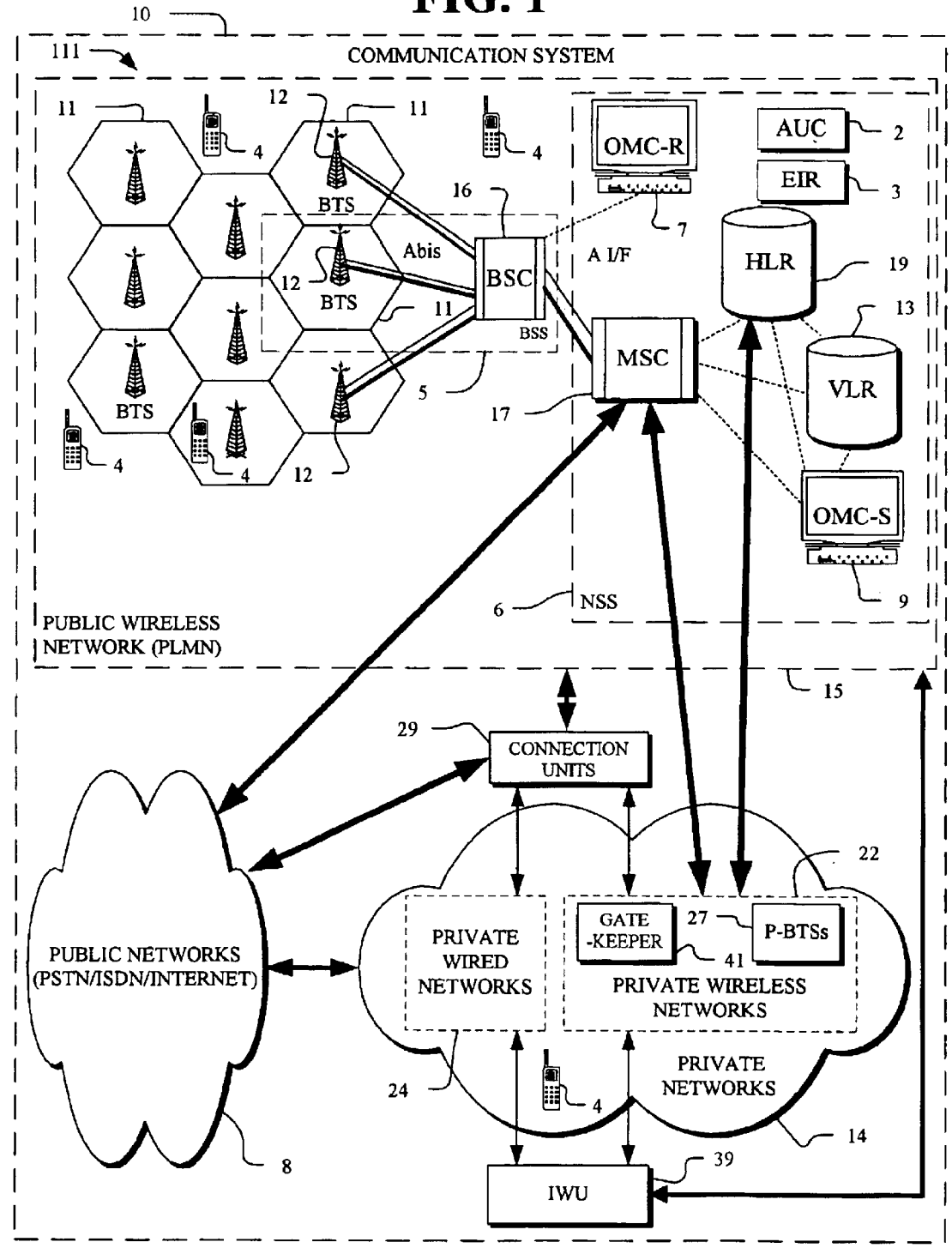
FIG. 1 is a block diagram representation of a communication system including a public wireless network, other public networks such as PSTN, ISDN and the Internet and including a private network.
Figure 2:
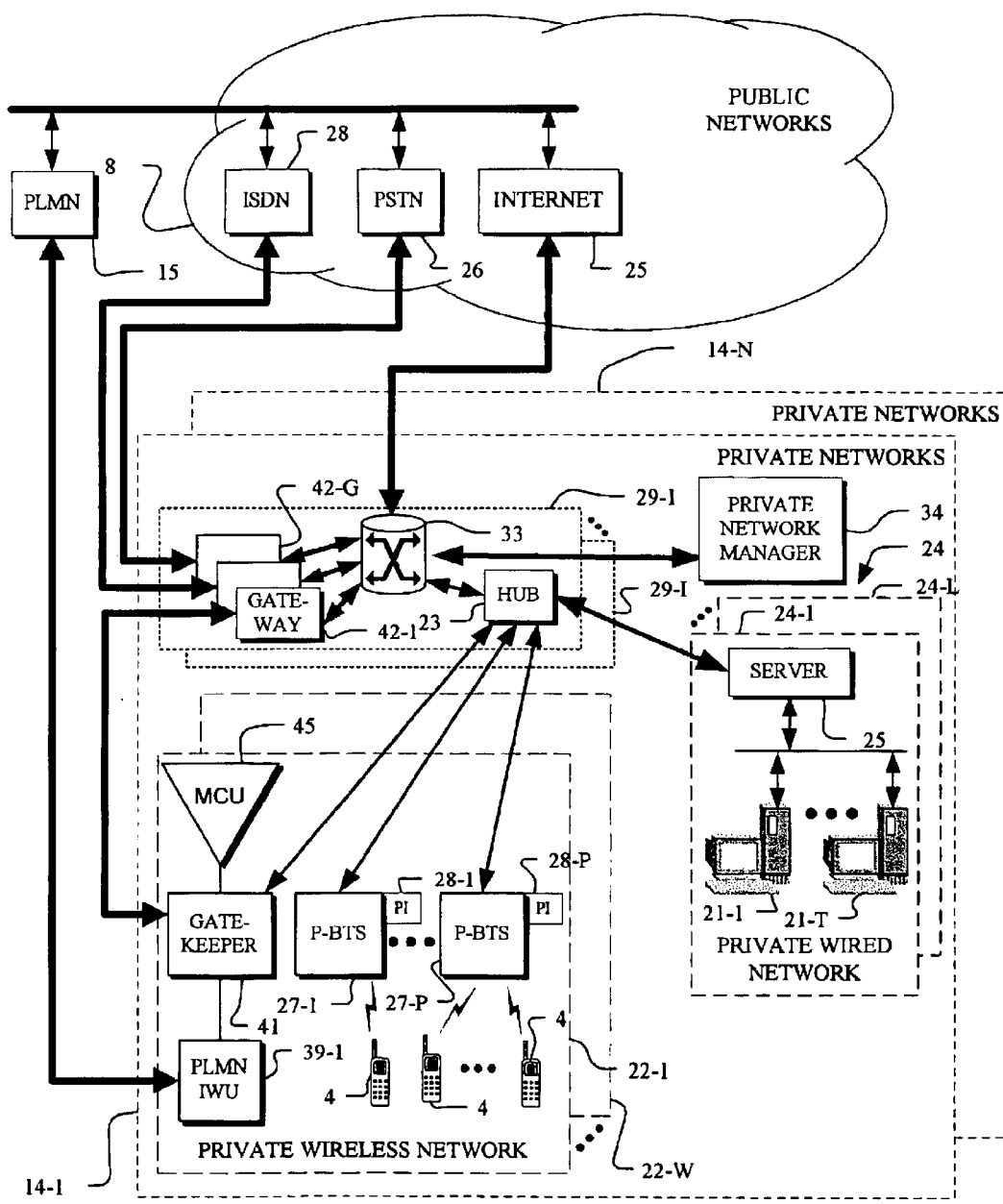
FIG. 2 depicts further details of the private network in the communication system of FIG. 1.

Communication System—FIG. 1 and FIG. 2

In FIG. 1, the communication system 10 includes a public wireless network 15, public networks 8 (such as PSTN, ISDN and the Internet) and private networks 14. The public wireless network 15 includes the ability to communicate, in a conventional manner, with conventional wireless mobile stations 4. The private networks 14 function to communicate with the conventional mobile stations (MS) 4 and provide additional private network capabilities not provided by the public wireless network 15.

The public wireless network 15 of FIG. 1, sometimes called the public land mobile network (PLMN), includes the mobile stations (MS) 4, Base Station Sub-System (BSS) 5 and the Network Sub-System (NSS) 6. The Base Station Subsystem (BSS) 5 is composed of the Base Transceiver Stations (BTSs) 12 and the Base Station Controller (BSC) 16. Each of the BTSs 12 includes a radio transceiver that defines the radio boundary of a cell 11 and handles the radio (Um) interface protocols with the mobile stations 4.

The cells 11 in the wireless public network 15 of FIG. 1 each exist over a different area and together the cells 11 collectively exist over a larger area designated as a region 111. Each cell 11 in the region 111 uses frequencies or other properties that are isolated from the frequencies or other properties of other cells in the region. When mobile stations 4 travel from one of the cells 11 to another one of the cells 11, a handover occurs.

The private networks 14 of FIG. 1 include private base stations (P-BTSs) 27 within the private wireless networks 22 for communications with mobile stations 4 located within the domain of the private networks 14. The private base stations (P-BTSs) 27 function in private regions formed of private cells (see private cells 411 of FIG. 3) within the domain of the private networks 14 of FIG. 1. The private cells 411 typically cover a portion of the area covered by one or more of the cells 11 of the public wireless network 15 of FIG. 1. Typically, the allocation of frequency spectrum in different public and private regions is under governmental control and frequency spectrum is allocated to different entities in different regions and different countries. The owner of the rights to particular frequencies in a region, including regions for public wireless network 15 and private wireless networks 22, controls the allocation of frequencies among public cells 11 of FIG. 1 and the private cells 411 (see FIG. 3).

The Base Station Controller (BSC) 16 manages the radio resources of one or more BTSs 12 across an Abis interface. The BSC 16 controls the radio network, including allocation of radio time slots and frequencies to mobile stations 4, release of resources, interpretation of measurement results and control of radio interface handovers. The BSC 16 interfaces to the NSS 6 via an A-interface to MSC 17.The Network Subsystem (NSS) 6 includes the Mobile Services Switching Center (MSC) 17 that provides, in a conventional system, the functions required to switch calls to/from the mobile stations 4 and the fixed public networks 8 (including PSTN and ISDN). In addition, the MSC 17 also provides the functions needed to track and maintain communication with mobile stations 4 and these functions include registration, authentication, location updating, MSC handovers, and call routing to roaming mobile stations 4. The GSM/TDMA/CDMA cellular system employs a Home Location Register (HLR) 19 and a Visitor Location Register (VLR) 13, an Authentication Center (AUC) secure database 2 and an Equipment Identity Register (EIR) 3. The Operations and Maintenance Center includes the OMC-R 7 and the OMC-S 9.

In FIG. 1, private networks 14 include the private wireless networks 22 (including private wireless networks 22-1, . . . , 22-W as shown in FIG. 2), private wired networks 24, including local area networks (LANs, 24-1, . . . , 24-L, as shown in FIG. 2), and connection units 29 (including connection units 29-1, . . . , 29-I as shown in FIG. 2). The private networks 14 can include wide area networks (WAN) and any other type of network presently or hereafter available. As shown in FIG. 2, the connection units 29 of FIG. 1 include, in one embodiment, hubs 23 for interconnecting the private wireless networks 22 and the LANs 24 and for connecting the private networks 14 to the public networks 8. As shown in FIG. 2, a typical hub 23 connects to a router 33 that directs calls among the public network facilities including the ISDN 28, the PSTN 26, the Internet 25 and the private networks 14. The private networks 14 use the same protocol as the Internet 25 and connects directly without need for a separate gateway. The connection units 29 include, as shown in FIG. 2, gateways 42-1, 42-2, . . . , 42-G for connecting the ISDN 28 and the PSTN 26 which use different protocols than the private networks 14.

In FIG. 1,the private wireless networks 22 include the wireless capabilities of the public wireless network 15 of FIG. 1. In addition, the private wireless networks 14 are suitable for operating with advanced technologies that are not generally available publicly. Current advanced technologies operate with rates of 384 kb/s and are approaching rates of 2 Mb/s for W-CDMA. In FIG. 1, wireless communications between the public BTSs 12 and mobile stations 4 operate with a wireless protocol such as GSM/TDMA/CDMA. In FIG. 1, wireless communications between the private P-BTSs 27 and mobile stations 4 for convenience and compatibility operate with the same wireless protocol (such as GSM/TDMA/CDMA) as used by the public BTSs 12 in the public wireless network 15.

In FIG. 1, the private wired networks 24 are typically local area networks (LANs) operating with a wired-packet protocol such as IP.

The private wireless networks 22 in FIG. 1 do not require the internal support of a circuit switch from the public networks and therefore, the private networks 14 in the FIG. 1 system can easily expand to accommodate new user requirements under control of the owners of the private networks 14.

In the private networks 14 of FIG. 1, the mobile stations 4 are typically unmodified, conventional wireless mobile station handsets like those widely used in conventional public wireless networks and therefore the mobile stations 4 can freely move between the public wireless network 15 of FIG. 1 and the private wireless networks 22 of FIG. 1 without restriction. Because of this free movement capability, only a single number is required for each mobile station 4 for both private wireless network communications and for public wireless network communications.

The private wireless networks 22 of FIG. 1 have P-BTSs 27 with corresponding private cells (P cells) 411 (see FIG. 3) in the private wireless domain. The public wireless network 15 of FIG. 1 has BTSs 12 with corresponding public cells 11 in the public wireless domain. The allocation of frequencies among the public wireless network cells and the private network cells is determined by agreement of the owners of the public wireless network 15 and the private networks 14.

The private wireless networks 22 of FIG. 1 each have an interworking unit (IWU) 39 that facilitates the inter working of different protocols that coact in processing calls from one wireless network to another. The private wireless networks 22 of FIG. 1 have gatekeepers 41 that function to correlate addresses that are for the same mobile stations but which are presented in different protocols.

Interconnected Public Wireless Network and Private Wireless Network—FIG. 2

In FIG. 2, private networks 14 include private networks 14-1, . . . , 14-N. Private network 14-1 is typical and includes the private wireless networks 22 (including private wireless networks 22-1, . . . , 22-W), local area networks (LANs) 24 (including LANs 24-1, . . . , 24-L), and connection units 29 (including connection units 29-1, . . . , 29-I). The private networks 14 can include wide area networks (WAN) and any other type of network presently or hereafter available. The connection unit 29 includes a hub 23 for interconnecting the private wireless networks 22 and the LANs 24 and for connecting the private network 14-1 to the public networks 8. The hub 23 connects to the router 33 that directs calls among the public network facilities including the ISDN 28, . . . , PSTN 26 and the Internet 24 and the private networks 14. The private networks 14 use the same protocol as the Internet 25 and connect directly without need for a separate gateway. The connection unit 29 includes gateways 42-1, . . . , 42-G for connecting the ISDN 28, . . . , PSTN 26 which use different protocols than the private networks 14.

In FIG. 2, the private wireless networks 22 include the wireless capabilities of the public wireless network 15 of FIG. 1. In FIG. 2, wireless communications between the private P-BTSs 27 and mobile stations 4 for convenience and comparability operate with the same wireless protocol (such as GSM) as used by the public BTSs 12 in the public wireless network 15.

In FIG. 2, the local area networks (LANs) 24 are private wired networks operating with a wired-packet protocol such as IP. LAN 24-1 is typical and includes, for example, a server 25 and LAN terminals 21 (including terminals 21-1, . . . , 21-T). Terminals 21-1, . . . , 21-T communicate with each other and with the public networks 8 through connection unit 29 using the wired-packet protocol.

In FIG. 2, the P-BTSs 27-1, . . . , 27-P are associated with protocol converters 28-1, . . . , 28-P, respectively, that connect P-BTSs 27-1, . . . , 27-P to connection unit 23 using the private network protocol used by the LANs 24 and the router 23. Therefore, the mobile stations 4 communicating through the P-BTSs 27 in the private networks 14 have access to the terminals 21 in LANs 24 and have access to the public networks 8.

In FIG. 2, the wireless P-BTS 27 directly connect the mobile stations 4 through router 33 to other facilities in private networks 14 and thereby permit, for example, the mobile stations 4 to send and receive calls to and from the terminals 21 in the LAN networks 24. Furthermore, the range of calls from and to mobile stations 4 in the private wireless network 22, using standard Internet protocols (IP), extends over the Internet in public networks 8 to any Internet facility such as different LANs and different corporations in different regions or countries.

The private wireless networks 22 in FIG. 2 do not require the internal support of a circuit switch (for example, an MSC) from the public networks and therefore, the private networks 14 in the FIG. 2 system can easily grow to accommodate new user requirements under control of the owners of the private networks 14.

In the private networks 14 of FIG. 2, the mobile stations 4 are typically unmodified, conventional wireless mobile station handsets like those widely used in conventional public wireless networks and therefore the mobile stations 4 can freely move between the public wireless network 15 of FIG. 1 and the private wireless networks 22 of FIG. 2 without restriction. Because of this free movement capability, only a single number is required for each mobile station 4 for both private wireless network communications and for public wireless network communications.

Figure 3:
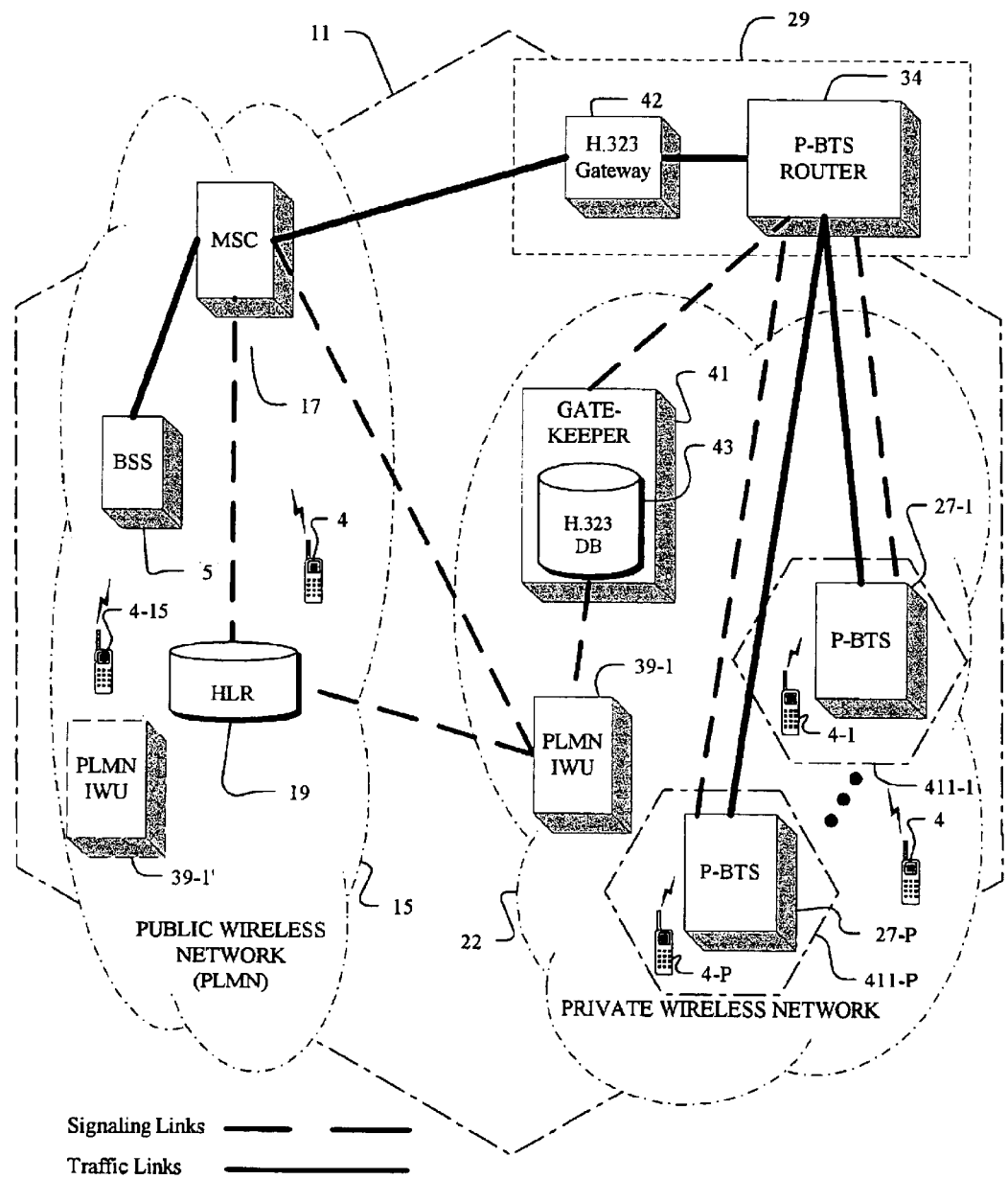
FIG. 3 depicts a coverage area serviced by both public (MSCs) and private (P-BTS) networks in which intercell handovers occur.

The private wireless networks 22 of FIG. 2 have P-BTSs 27-1, . . . , 27-P which operate in the private cells 411 (See FIG. 3). The allocation of frequencies among the public wireless network cells 11 and the private network cells 411 is determined by agreement of the owners of the public wireless network and the private networks 14.

In order to allow users to roam freely between the public wireless network 15 and private wireless networks 22, a PLMN interworking unit (PLMN IWU) 39-1 is provided. The PLMN IWU 39-1 connects to the Private Wireless Networks, Gatekeeper 41 and the PLMN 15. The PLMN TWU 39-1 can be connected to the H.323 Gatekeeper database 43 by a number of means, however in this example, the IWU is connected via an IP link. The PLMN IWU 39-1 is connected to the PLMN via a Signaling System 7 (SS7) link that is running Message Transfer Part (MTP), Signaling Connection Control Part (SCCP), Transactions Control Application Part (TCAP) and the Mobile Application Part (MAP). The PLMN IWU 39-1 converts between the signaling protocols found in the Private Network 22-1 which are based upon IP and the PLMN which is based up SS7.

In FIG. 2, the gatekeeper 41 includes a local database (see data base 43 in FIG. 3) which communicates via IP providing local user authentication, a local client for communicating with a remote protocol gateway (gateway 42 provides remote IP-to-SS7 conversion) through cell router 34, and a local interface module which communicates over IP to the PLMN IWU 39-1.

The interworking unit (IWU) 39, when the IWU is a Public Land Mobile Network Interworking Unit (PLMN IWU), provides a link between the domain of the private wireless network 22 and the domain of the public wireless network (PLMN) 15. In a preferred embodiment, the signaling for the private wireless network 22 operates in the IP domain and signaling for the public wireless network 15 operates in the SS7 domain. In such an embodiment, the PLMN IWU 39-1 contains, in one embodiment, two independent software stacks, one for the private IP domain and one for the public SS7 domain.

In FIG. 2, the P-BTSs 27 are in the private wireless network 22 of FIG. 1 and FIG. 2. In this embodiment, each P-BTS 27 contains the required protocol stacks to perform the functions of the wireless control signaling from the mobile station 4 and the H.323 endpoint, gatekeeper 41 or gateway 42. In this embodiment, the H.323 endpoint can be a PC based terminal 21 (see FIG. 2) or another mobile station 4. The gatekeeper 41 provides the functions necessary to control the "terminals" within the H.323 domain and, in this embodiment, "terminals" include GSM mobile stations 4.

The H.323 gatekeeper 41 provides the functions required to register the mobile stations 4 (equivalent to Location Updating), permit access to the network, translation of called numbers and routing of calls, if required. These functions are largely equivalent to those normally found in the MSC 17 or HLR 19 (see FIG. 1) of a public wireless network 15. The gatekeeper functions only need to exist in one P-BTS 27 of the P-BTS 27-1, . . . , P-BTS 27-P within the H.323 zone of FIG. 2. In one embodiment, a tone and announcement module in gatekeeper 41 handles the actual generation of the various tone and announcement used according to the Call Control based on different call handling situations. Tone and Announcement are usually played towards the "far-end" LAN direction while only a tone is played toward the local MS direction.

In order to support the full range of wireless functions, the functions of a standard H.323 gatekeeper are augmented. The redesign includes the addition of a Local User Database (LUDB) 6—6 (See FIG. 6) to control the mobile station and provide Supplementary Services (SS) functionality. The gatekeeper database contents are transferred to the serving P-BTS when the mobile station 4 registers (that is, Location Updating has taken place) on a P-BTS. For example, if a mobile station 4 has registered on P-BTS 27-1 in FIG. 2 and the user data of mobile station 4 is stored with the gatekeeper 41 supported by P-BTS 27-3, then the relevant contents of the user database in P-BTS 27-3 are transferred to P-BTS 27-1 when the registration takes place. Any updates or alterations to the data by interaction of mobile station 4 are reflected back to the main gatekeeper database 7-3 stored in the gatekeeper 41. This approach reduces the amount of call control signaling that is required within a LAN and provides redundancy for increased reliability.

In order to provide external PSTN or public wireless network interconnection, an H.323 gateway 42 is provided in FIG. 2. The gateway 42 is part of the normal VoIP LAN-PSTN operation. The gateway 42 provides line interface and transcoding functions that allow the voice and data traffic to be sent to existing networks (for example, PSTN, ISDN, B-ISDN, PBX).

An additional function required of a P-BTS 27 when used in a LAN environment of FIG. 2 is the ability to control the handover of mobile stations 4 between different P-BTSs 27 as mobile stations 4 move around within the LAN zone serviced by the private networks 14 of FIG. 2. The handover decision is made internally within each P-BTS 27, only the signaling necessary to command a handover needs to go between the P-BTSs 27.

Figure 14:
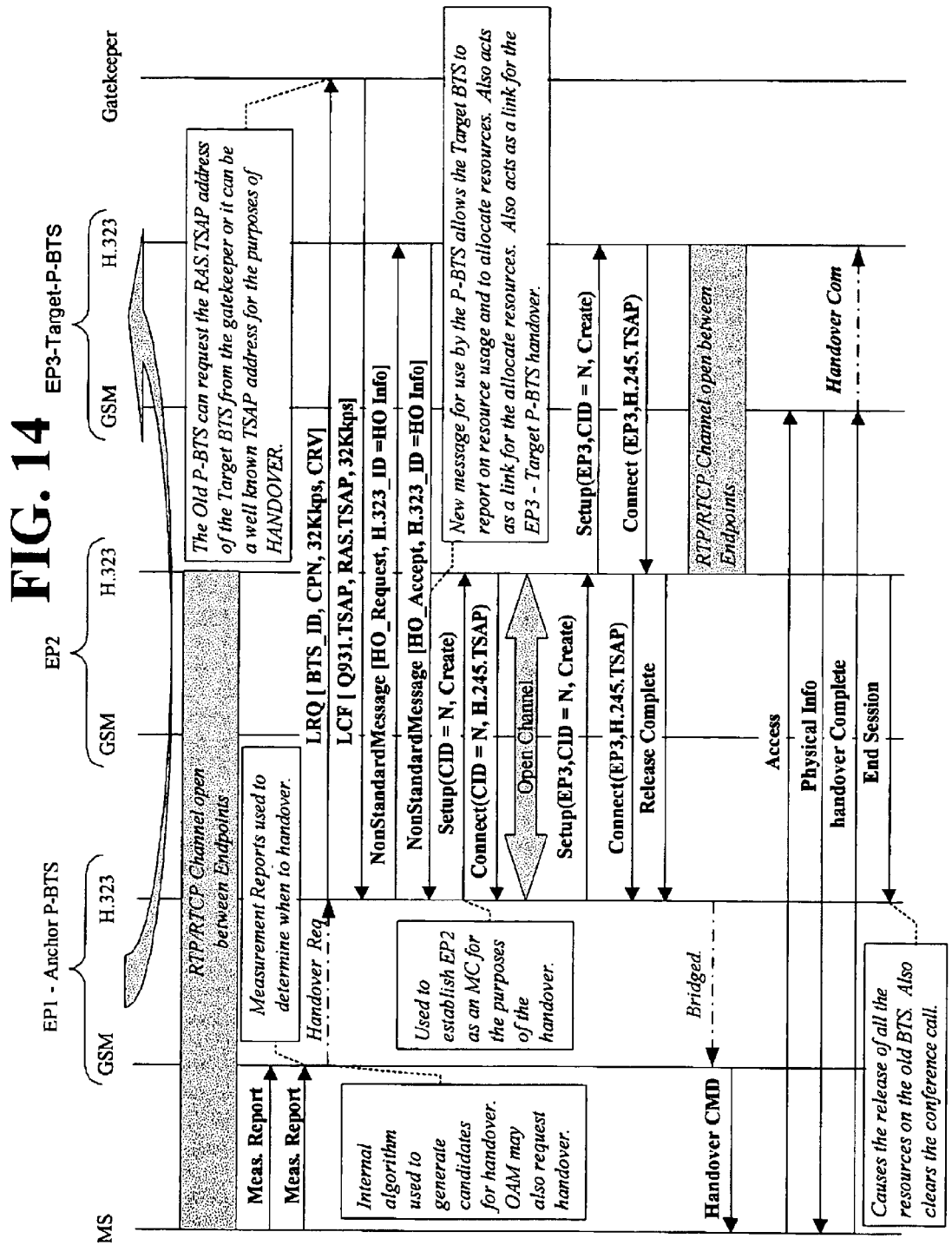
FIG. 14 depicts the call flows of one method of implementing an anchor P-BTS to target P-BTS handover.

In FIG. 2, the Multi-Conference Unit (MCU) 45 is used to bridge the old P-BTS and the target P-BTS in embodiments of TDMA systems where the bridge is used during the handover procedure as explained in detail in the FIG. 14 call flow description. It is also used to bridge the anchor P-BTS and the target P-BTS in embodiments of CDMA and W-CDMA systems where the bridge is used both during the handover procedure as well as after the completion of the handover procedure.

Signaling Links and Traffic Links between Private and Public Wireless Networks—FIG. 3

FIG. 3 provides a detailed view of a private wireless network 22, having a PLMN IWU 39, interconnected between the public wireless network (PLMN) 15 and private wireless network 22. The private wireless network 22 includes a plurality of P-BTS 27, including P-BTS 27-1, ..., 27-P, each associated with a corresponding private cell 411, including the private cells 411-1, ..., 411-P, respectively. The public wireless network 15 includes an MSC 17 and a BSS 5 associated with the public cell 11. The public cell 11 typically covers a larger area than the private cells 411 and typically the private cells 411 are within the operating region of the public cell 11. Each of the public and private cells include mobile stations 4, for example, mobile station 4-1 is typical of the mobile stations serviced by P-BTS 27-1 in the private wireless network 22 and mobile station 4-P is typical of the mobile stations serviced by P-BTS 27-P in the private wireless network 22. The mobile station 4-15 is typical of the mobile stations serviced by BSS 5 in the public wireless network 15.

In FIG. 3, the PLMN IWU 39-1 is interconnected to the public HLR 19 and MSC 17 of the public wireless network (PLMN) 15 via signaling links (shown as broken lines in FIG. 3). In the embodiment described, these signaling links use the SS7 protocol. The PLMN IWU 39-1 also connects to the gatekeeper 41 that includes the H.323 database 43 via a signaling link that uses the IP protocol. In the embodiment described, the PLMN IWU 39-1 connection to the gatekeeper 41 only carries signaling information, however, in other embodiments, it may carry voice or other related signaling traffic.

While the PLMN IWU 39-1 has been shown as a single entity located in the private wireless network 22, the PLMN IWU 39-1 can also be located in the public wireless network 15 (shown with broken lines as 39-1') as a single entity or can be distributed in parts at various different locations. The links between the PLMN IWU 39-1 and other components are implemented as a function of where the PLMN IWU 39-1 or its parts are located. In FIG. 3, the PLMN IWU 39-1 is located as a single entity in the private wireless network 22 and the links from the PLMN IWU 39-1 with the MSC 17 and HLR 19 exist in different forms. In one form, the links are leased lines or other direct connections. In another embodiment, the connections between the PLMN IWU 39-1 and the PLMN 15 are indirect through, for example, the cell router 34.

In FIG. 3, the public wireless network (PLMN) 15 includes the gatekeeper 41 that connects to a connection unit 29. The connection unit 29 includes means for interconnecting a mobile station 4, for example, mobile station 4-1 serviced by P-BTS 27-1 in the private wireless networks 22 to another mobile station 4, for example, mobile station 4-P serviced by P-BTS 27-P in the private wireless network 22. Also, the connection unit 29 includes means for interconnecting a mobile station 4, for example, mobile station 4-1 serviced by P-BTS 27-1 in the private wireless networks 22 to another mobile station 4, for example, mobile station 41-15 serviced by the BSS 5 in the public wireless network 15. When such connections involve different signaling protocols, each of the protocols are abstracted to the protocol (for example, H.323) database 43.

The connection unit 29 can use any convenient switching or routing apparatus for directing calls from one mobile station to another. For example, in one embodiment described, the cell router 34 in connection unit 29 is an IP router that uses IP addresses for routing calls among the P_BTSs 27 or for routing calls through H.323 gateway 42 to the public wireless network 15. In another example, the cell router 34 includes an ATM or other switch that switches calls among mobile stations 4 located in any of the cells including public cell 11 and private cells 411-1, ..., 411-P.

The gatekeeper 41 enables protocol independent cell routing using cell router 34 with information from address correlation database 43. Gatekeeper 41 includes a lookup table which correlates identifiers in different protocols. The different protocols include, for example, IP addresses, MSRN numbers, and virtual circuit identifiers (VCI). The correlation performed in gatekeeper 41 using database 43 enables any embodiment of cell router 34 to correlate identifiers from different protocols. Byway of example, the router 34 in different embodiments is implemented as an IP router, a frame relay switch, or an ATM switch. In each of the se embodiments, ceU router 34 functions to switch and/or route mobile traffic to and from mobile stations 4.

The switching role of a conventional MSC 17, such as shown in FIG. 1, is fulfilled by packet or cell routing hardware included within cell router 34. In operation, for example, when a mobile station 4 in FIG. 3 requests a path through the network, the gatekeeper 41 maps an MSRN number to an appropriate IP address in the case of an IP router. In operation, for another example, when a mobile station 4 in FIG. 3 requests a path through the network, the gatekeeper 41 maps a VCI address to an appropriate IP address in the case of an ATM switch and further the gatekeeper 41 maps an MSRN number to the appropriate IP address. Similar mappings are effected for any IP, frame, ATM switch or other routing or switching mechanism. The IP, MSRN, VCI or other identifier mapping occurs in the gatekeeper 41 and hence operation is independent of any particular embodiment of router 34. Also, the particular routing mechanism employed for switching calls among cells is external to the private wireless network 22. The private wireless network 22 is able to operate with any protocol that may exist or may be defined.

Figure 4:
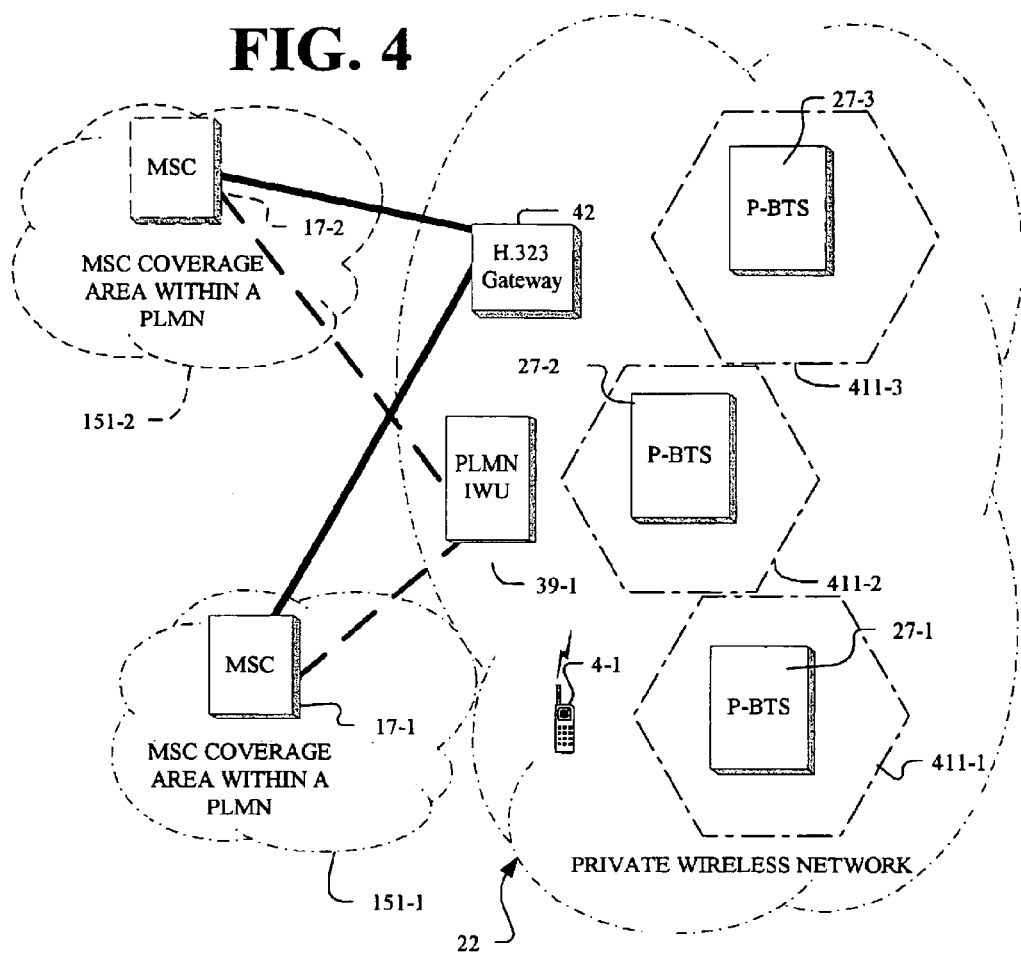
FIG. 4 depicts the architecture of a public land mobile network interworking unit (PLMN IWU) used in the private wireless network of FIG. 1 and FIG. 2 to communicate with the public land mobile network (PLMN).

Public (MSCs) and Private (P-BTS) Networks—FIG. 4

FIG. 4 depicts public coverage areas 151-1 and 151-2 serviced by public MSCs 17-1 and 17-2, respectively, within PLMN and private coverage areas 411-1, 411-2 and 411-3 serviced by private P-BTS 27-1, 27-2 and 27-3, respectively, in a private wireless network 22. Intercell handovers occur between the public MSCs and the private P-BTSs using the H.323 Gateway 27-2 and the PLMN IWU 39-1 in the private wireless network 22.

Figure 5:
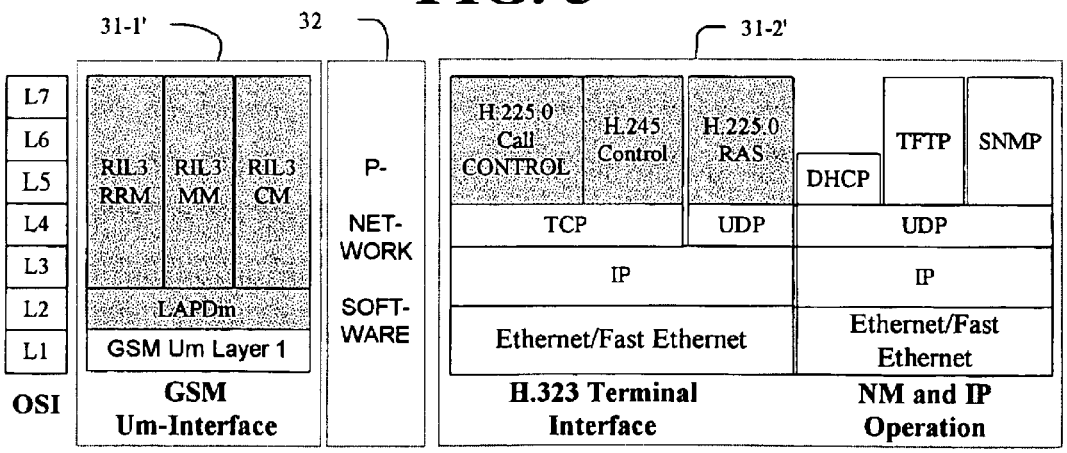
FIG. 5 depicts primary interface protocol stacks for wireless GSM base with added private network (P-BTS) software.

Protocol Stacks for Signaling—FIG. 5

In a GSM example of the present invention, the FIG. 1 public wireless network 15 includes conventional GSM base station software that does not provide support for call control or connection to the private wired protocol (Internet Protocol) that is used in the private networks 14 of FIG. 1 and FIG. 2. Accordingly, the conventional GSM base station software requires protocol interfaces to facilitate inter-operation of the wireless protocol and the wired-packet protocol. For convenience, the protocol interfaces, namely protocol interfaces 28-1, . . . , 28-P, are located with the P-BTSs 27-1, . . . , 27-P in a private wireless networks 14 of FIG. 2.

To support the architecture, the standard GSM stack is modified by the P-Network Software 32 as shown in the FIG. 5. In FIG. 5, the components 31-1' and 31-2' are equivalent to the standard components of a GSM stack. As can be seen from FIG. 5, in addition to the private Wireless Air Interface requirements and the H.323 Terminal Equipment requirements, the LAN based P-BTS 27 also provides the following functionality:

Interworking between the two Call Control Functions—private wireless and LAN based.

Private Wireless Mobility Management (since there is no BSC or MSC in the standard GSM stack).

Figure 6:
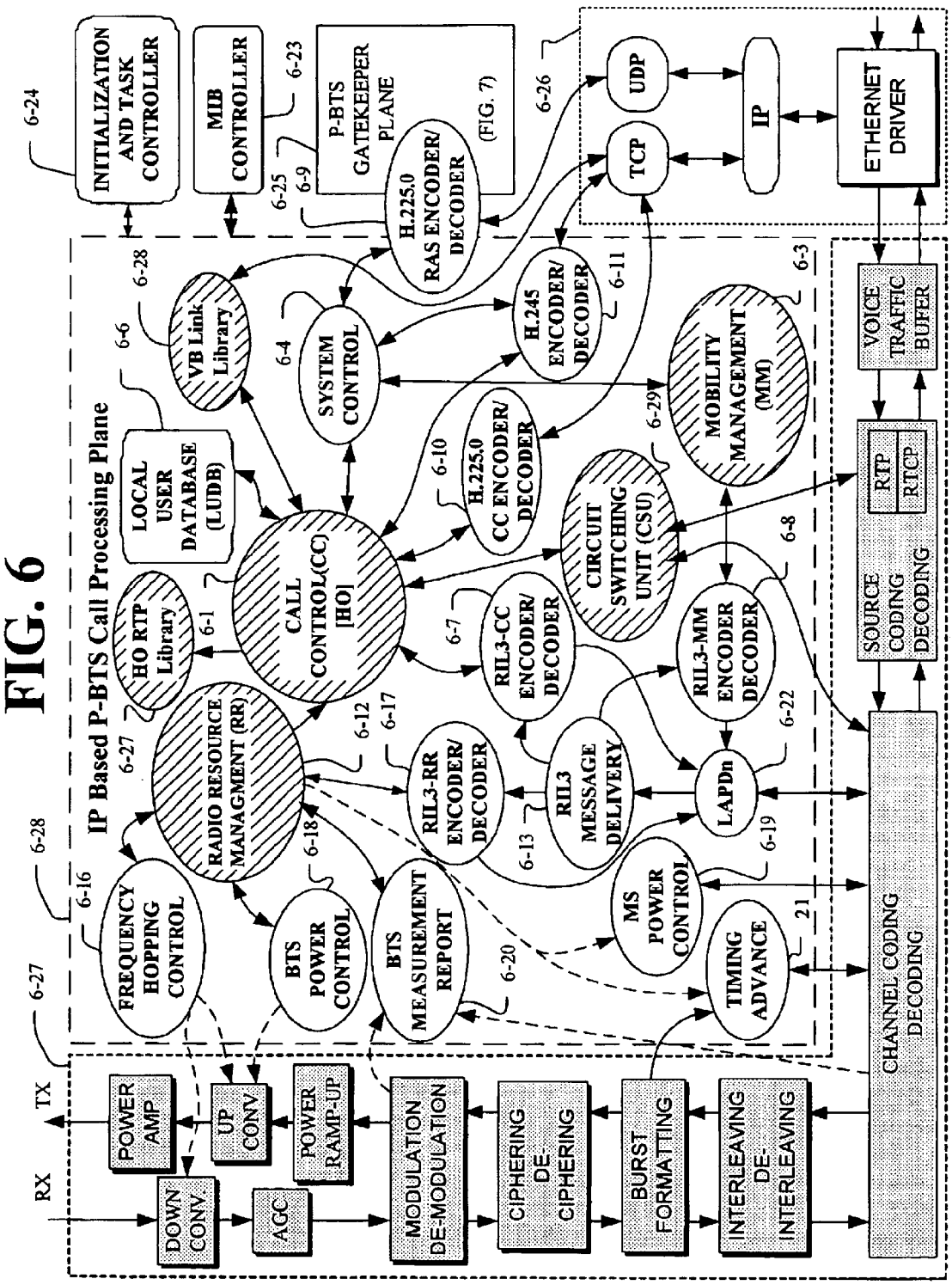
FIG. 6 depicts a call processing plane of software modules for IP-Based private wireless base stations (P-BTS).

The Call Processing Plane Software Modules are significantly more complicated than those found in a normal public BTS and are defined in FIG. 6.

Call Processing Plane Software Modules for IP-Based P-BTS—FIG. 6

In FIG. 6, the software modules for the call processing plane include modules, indicated in FIG. 6 by cross-hatched ovals, used for inter-cell handover operation of P-BTSs 27 as follows:

Call Control Module—The module 6-1 is responsible for the "call feature control" function for the mobile station, including both basic Call Control (CC) as well as Call Related Supplementary Services (CRSS). The module 6-1 includes the handover (HO) control for controlling the handover of MSs.

Mobility Management Module—The module 6-3 is responsible for handling the Mobility Management Function of the mobile station, including location update and handover control/co-ordination This function was originally located in the private wireless MSC and is fulfilled in the IP-based P-BTS. It also provides the ability to find a terminating mobile station and the ability to handle the call when the mobile station moves from one P-BTS to another P-BTS.

System Control Module—The module 6-4 is responsible for the End-Point registration, Administration, and status reporting in LAN. This entity is the "end-point" function and does not cover the gatekeeper functions which may be resident on the same P-BTS as well.

Local User Database Module (LUDB)—The module 6-6 maintains a copy of user data for each of the mobile stations that is registered on the current P-BTS. The data is stored in local memory as a "cache." Any changes to the local copy will be "written-back" to the domain user database automatically. All the other modules who need the user data to operate interact with the Local User Database module for the data interrogation. The Local User Database Module will interact with the Domain User Database Module when necessary and does it in a way that is transparent to all the other modules in the P-BTS.

RIL3-CC Encoder/Decoder Module—The module 6-7 is responsible for encoding and decoding the GSM Radio Interface Layer 3 Call Control messages.

RIL3-MM Encoder/Decoder Module—The module 6-8 is responsible for encoding and decoding the GSM Radio Interface Layer 3 Mobility Management messages.

H.225.0 RAS Encoder/Decoder Module—The module 6-9 is responsible for encoding and decoding the H.225.0 Registration Administration and Status (RAS) messages. This module is shared between Call Processing Plane and the gatekeeper Plane.

H.225.0 CC Encoder/Decoder Module—The module 6-10 is responsible for encoding and decoding the H.225.0 Call Control messages. The H.225.0 Call Control Message is based on ISDN Q.931 Message Set.

H.245 Encoder/Decoder Module—The module 6-11 is responsible for encoding and decoding the H.245 messages. The H.245 specification defines a set of messages for controlling the allocation and management of the logical channels for multimedia applications.

RRM Module—The module 6-12 is responsible for the entire Radio Resource Management functionality that is normally split between the BTS and the BSC in the traditional architecture. The RRM Module will directly interface with the Call Control Module for radio resource functions, such as channel set-up, paging, etc.

RIL3 Message Delivery Module—The module 6-13 is responsible for looking into the protocol discriminator field in the layer-3 message header to determine which module has to process this message. The delivery of the CC message will now be sent to the RIL3-CC Encoder/Decoder Module, and the MM message to the RIL3-MM Encoder/Decoder Module.

SMSCB Controller Module—The SMS-CB module 6-15 is used to keep track of the functionality of receiving and distributing the SMS CB messages that are to be broadcast by all or part of the P-BTSs within the current H.323 Zone.

Frequency Hopping Control Module—The module 6-16 controls the frequency of communications for the target mobile station.

RIL3RR Encoder/DecoderModule—The module 6-17 decodes and encodes the RIL3-RR messages to and from the BTS internal RR message formats. The formats of the RIL3-RR messages are specified in the GSM Technical Specification 04.08 along with the RIL3-MM, RIL3-CC, RIL3-SS, and RIL3-SMS messages specifications. This module provides the encoding and decoding of the RIL3-RR message which is required for the P-BTS.

BTS Power Control Module—The module 6-18 is responsible for providing the P-BTS power control (down-link) both statically and dynamically. The P-BTS Power Control Module takes the Mobile Uplink Measurement Data that is sent from a mobile, that is in dedicated mode, and compiled to provide the best power adjustment strategy for the given mobile. The goal is to maintain the P-BTS power in the optimal level so that the signal strength and signal quality for the down-link signal is within the private wireless quality guideline without causing excessive interference to the adjacent cell sites that are using the same or adjacent frequencies.

MS Power Control Module—The module 6-19 interfaces with the Channel Encoding and Decoding to add/retrieve the power control information into/out-off the header fields of the Layer 1 messages. The retrieval of the Mobile's up-link power level and the encoding of the command to instruct Mobile Station to increase/decrease the output power should be separated from the intelligence of performing sliding window algorithm over Mobile's power level and making decision to increase or decrease the MS power level.

BTS Measurement Report Module—The module 6-20 interfaces with GSM burst processing components to obtain the P-BTS measurement of the Mobile uplink signal. Specifically, the Automatic Gain Control and Demodulator for uplink power-level, and the Channel decoding unit for signal quality. Depending on the actual hardware architecture the input may come from more than just the three components identified above.

Timing Advance Module—The module 6-21 interfaces with the Burst Format function and retrieves the burst delay information for the Mobile, and then interfaces with the Channel Encoding and Decoding to add the Mobile timing advance information into the layer-1 header field. The Timing Advance Module can be treated as part of the Traffic Channel Processing Domain or as part of the Call Processing Domain. It autonomously monitors the delay of the arriving burst and instructs the burst formatting function to encode the amount of timing-advance that the mobile station needs to do in order to let the burst arrive within the burst envelope that the BTS is expected.

LAPDn Module—The module 6-22 interfaces the message delivery to the channel coding/decoding.

CSU Module—The module 6-29 is a circuit switching unit that controls the switching of calls. This module provides software based routing mechanism for routing RTP (Real Time Protocol) based packet voice data between the GSM time slots (traffic only) and VoIP data ports. This module provides the abstraction of "port." Different ports can be connected either duplex or simplex. It can also connect two GSM time slots together or two VoIP ports together to allow loop-back connection on both interfaces.

HO RTP Library—The module 6-27 is a handover library for the transport layer. This module handles the management of the RTP ports dedicated to the handover from/to a P-BTS. RTP/RTCP is the H.323 based transport protocol used for virtual connections over IP for the transportation of voice packets.

VB Link Library—The module 6-28 a link library that provides an underlying transport mechanism for the signaling exchange between the P-BTS and the GateKeeper. It is based on TCP over IP protocol.

Figure 7:
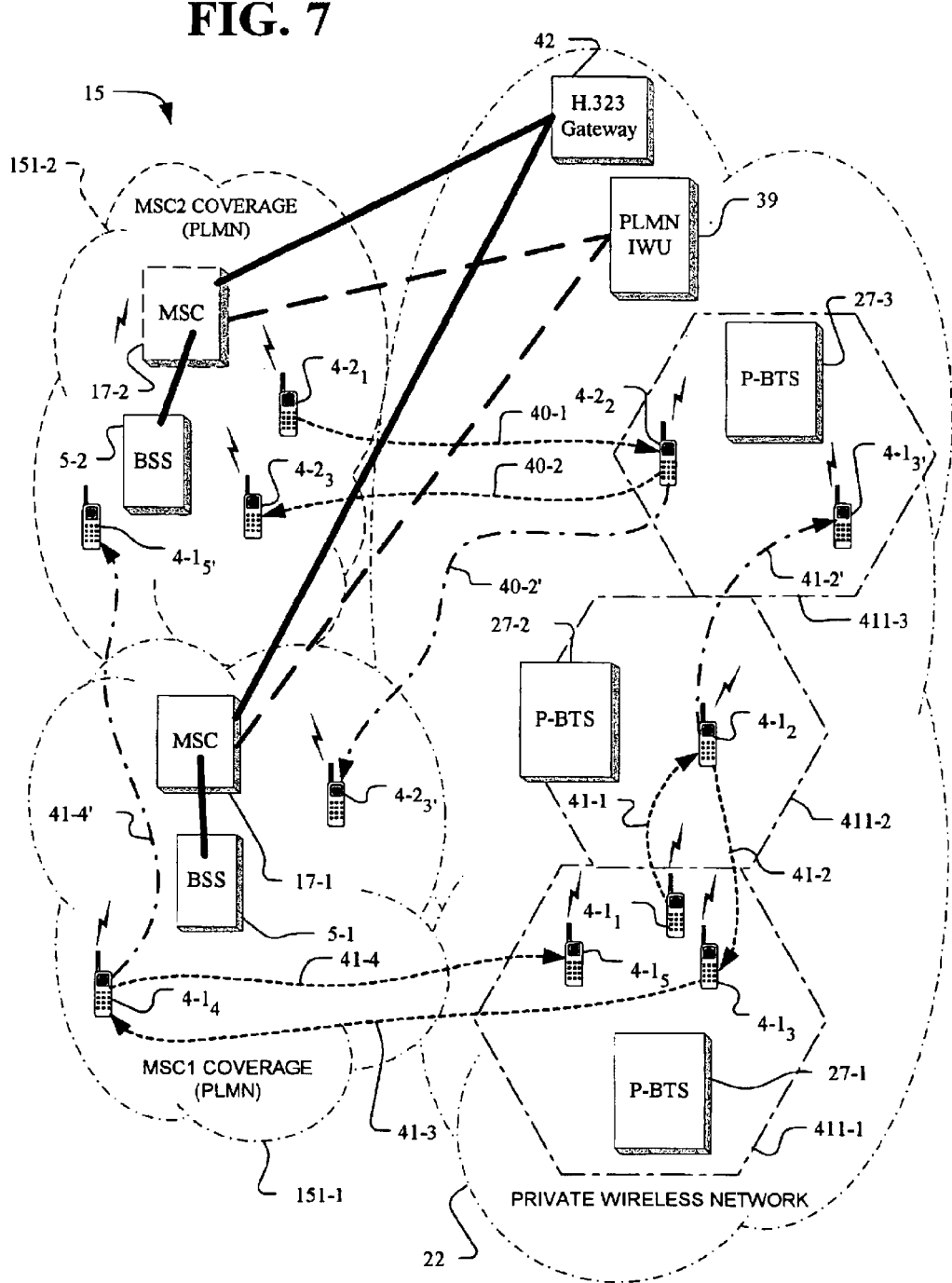
FIG. 7 depicts a wireless system including a public wireless system and a private wireless system with a MS that moves throughout the wireless system to locations requiring different handover operations.

Handover Operation With P-BTS—FIG. 7

FIG. 7 depicts a wireless system including a public wireless system 15 and a private wireless system 22 with a MS 4-1 that moves throughout the wireless system to locations indicated by 4-1$_1$, 4-1$_2$, 4-1$_3$, 4-1$_4$ and 4-1$_5$ and to alternate locations 4-1$_{3'}$, 4-1$_{4'}$. FIG. 7 also depicts MS 4-2 that moves throughout the wireless system to locations indicated by 4-2$_1$, 4-2$_2$ and 4-2$_3$ and to alternate location 4-2$_{3'}$. As the MS 4-1 and 4-2 move to different locations, different handover operations occur. FIG. 7 is used to depict examples of handover operations as mobile stations 4-1 and 4-2 move about in the wireless system coverage areas.

In FIG. 7, the wireless system includes wireless P-BTS 27-1, 27-2 and 27-3 in the private wireless network 22 and standard MSCs 17-1, 17-2 and BSSs 5-1, 5-2, respectively, in a public wireless network (PLMN) 15. The coverage area of MSC 17-1 is indicated as 151-1 and the coverage area of MSC 17-2 is indicated as 151-2. The coverage areas of the wireless P-BTS 27-1, 27-2 and 27-3 are schematically represented by the hexagons 411-1, 411-2 and 411-3, respectively. The relative sizes of the coverage areas is not intended to be represented in FIG. 7 since typically, the PLMN coverage areas 151-1 and 151-2 will be larger than the coverage areas 411-1, 411-2 and 411-3 of the private wireless network 22. The private wireless network 22 includes the H.323 gateway 42 and the PLMN IWU 39.

In one example, mobile station 4-1 is initially at a location indicated by 4-1$_1$ in the coverage area 411-1 serviced by the P-BTS 27-1. Then, the mobile station 4-1 moves from the location indicated by 4-1$_1$ in the coverage area 411-1 to the coverage area 411-2 at location 4-1$_2$ serviced by the P-BTS 27-2 and a private-to-private handover procedure represented by arrow 41-1 occurs handing over from P-BTS 27-1 to P-BTS 27-2. Then, the mobile station 4-1 moves back from the location indicated by 4-1$_2$ in the coverage area 411-2 to the location 4-1$_3$ in the coverage area 411-1 serviced by the P-BTS 27-1 and a back handover (private-to-private handback) procedure represented by arrow 41-2 occurs handing back to P-BTS 27-1. This example demonstrates a private-to-private handover followed by a private-to-private handback.

In another example, the mobile station 4-1 moves from the location indicated by 4-1$_3$ in the coverage area 411-1 to the location 4-1$_4$ in the coverage area 151-1 serviced by the MSC 17-1 and the BSS 5-1 and a private-to-public handover procedure represented by arrow 41-3 occurs handing over to BSS 5-1. Then, the mobile station 4-1 moves back from the location indicated by 4-1$_4$ in the coverage area 151-1 to the location 4-1$_5$ in the coverage area 411-1 serviced by the P-BTS 27-1 and a back handover (public-to-private handback) procedure represented by arrow 414 occurs handing back to P-BTS 27-1. This example demonstrates a private-to-public handover followed by a public-to-private handback.

In another example, the operation starts the same as in the first example where mobile station 4-1 is initially at a location indicated by 4-1$_1$ in the coverage area 411-1 serviced by the P-BTS 27-1. Then, the mobile station 4-1 moves from the location indicated by 4-1$_1$ in the coverage area 411-1 to the coverage area 411-2 at location 4-1$_2$ serviced by the P-BTS 27-2 and a private-to-private handover procedure represented by arrow 41-1 occurs handing over from P-BTS 27-1 to P-BTS 27-2. Then, the mobile station 4-1 moves from the location indicated by 4-1$_2$ in the coverage area 411-2 to the coverage area 411-3 at location 4-1$_3$, serviced by the P-BTS 27-3 and a private-to-private handover to third procedure represented by arrow 41-2' occurs handing over to P-BTS 27-3. This example demonstrates a private-to-private handover followed by a private-to-private handover to third.

In another example, the operation starts in location 4-1$_3$ in the coverage area 411-1 serviced by the P-BTS 27-1. The mobile station 4-1 moves from the location indicated by 4-1$_3$ in the coverage area 411-1 to the location 4-1$_4$ in the coverage area 151-1 serviced by the MSC 17-1 and the BSS 5-1 and a private-to-public handover procedure represented by arrow 41-3 occurs handing over to BSS 5-1. Then, the mobile station 4-1 moves from the location indicated by 4-1$_4$ in the coverage area 151-1 to the location 4-1$_{4'}$ in the coverage area 151-2 serviced by the MSC 17-2 and the BSS 5-21 and a public-to-public handover to third procedure represented by arrow 41-4' occurs handing over to BSS 5-2. This example demonstrates a private-to-public handover followed by a public-to-public handover to third.

In a further example, mobile station 4-2 is initially at a location indicated by 4-2$_1$ in the coverage area 151-2 serviced by the MSC/BSS (17-2/5-2). Then, the mobile station 4-2 moves from the location indicated by 4-2$_1$ in the coverage area 151-2 to the coverage area 411-3 at location 4-2$_2$ serviced by the P-BTS 27-3 and a public-to-private handover procedure represented by arrow 40-1 occurs handing over from MSC/BSS (17-2/5-2) to P-BTS 27-3. Then, the mobile station 4-2 moves back from the location indicated by 4-2$_2$ in the coverage area 411-3 to the location 4-2$_3$ in the coverage area 151-2 serviced by the MSC/BSS (17-2/5-2) and a back handover (private-to-public handback) procedure represented by arrow 40-2 occurs handing back to MSC/BSS (17-2/5-2). This example demonstrates a public-to-private handover followed by a private-to-public handback.

In a still further example, mobile station 4-2 is initially at the location indicated by 4-2$_1$ in the coverage area 151-2 serviced by the MSC/BSS (17-2/5-2). Then, the mobile station 4-2 moves from the location indicated by 4-2$_1$ in the coverage area 151-2 to the coverage area 411-3 at location 4-2$_2$ serviced by the P-BTS 27-3 and a public-to-private handover procedure represented by arrow 40-1 occurs handing over from MSC/BSS (17-2/5-2) to P-BTS 27-3. Then, the mobile station 4-2 moves from the location indicated by 4-2$_2$ in the coverage area 411-3 to the location 4-2$_{3'}$ in the coverage area 151-1 serviced by the MSC/B SS (17-1/5-1) and a private-to-public handover to third procedure represented by arrow 40-2' occurs handing over to MSC/BSS (17-1/5-1). This example demonstrates a public-to-private handover followed by a private-to-public handover to third.

Public Network and Private Network Operations—FIG. 8–FIG. 13.

Operations that involve both the PLMN public wireless networks 15 of FIG. 7 and the private wireless network 22 of FIG. 7, for example, are represented in the call flows of FIG. 8 through FIG. 13.

Figure 8:
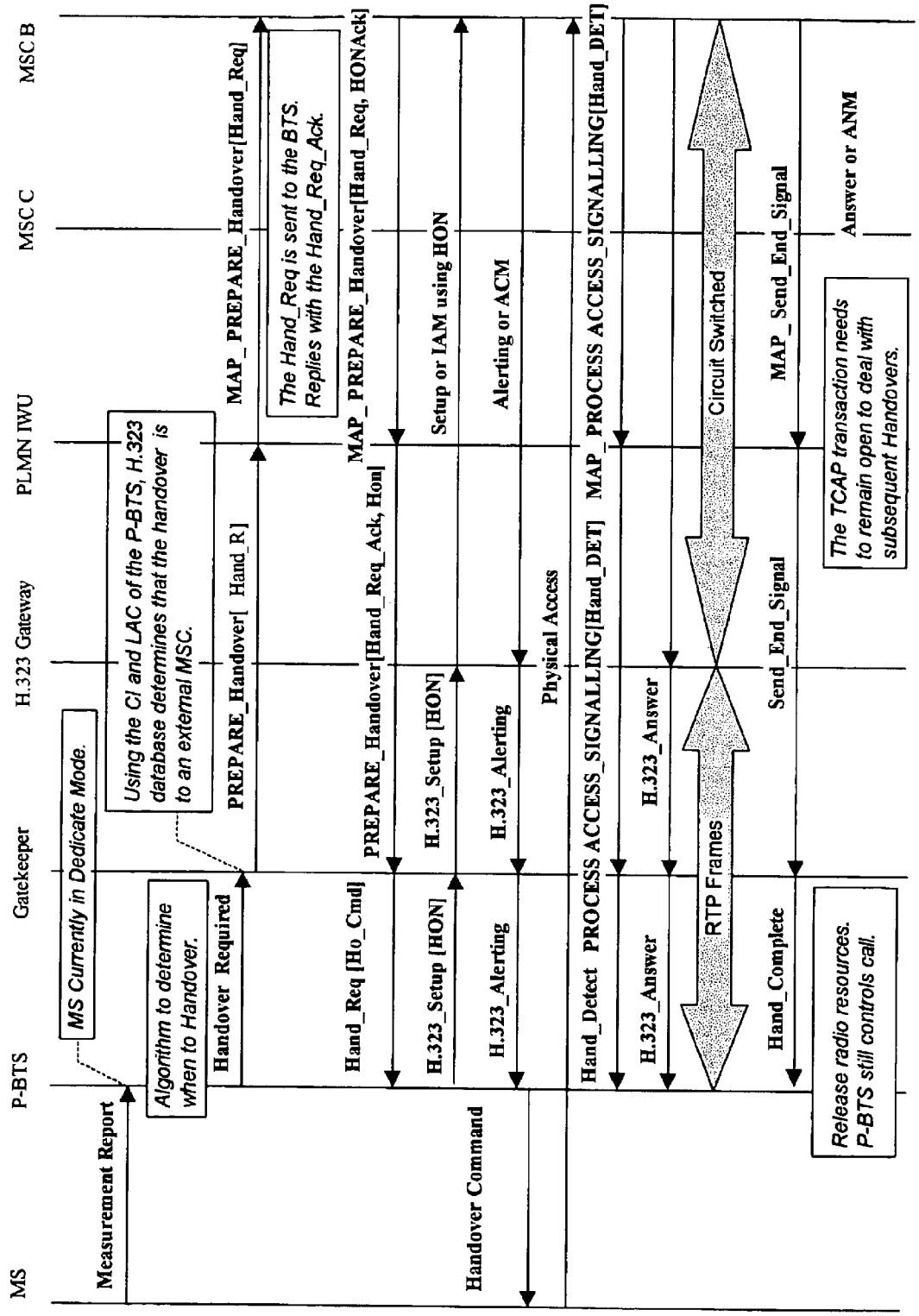
FIG. 8 depicts the call flows of a handover of an MS from the a private network P-BTS to a public network MSC/BSS via the PLMN IWU.

FIG. 8 depicts the call flows of a handover of an MS from the a private network P-BTS to a public network MSC/B SS via the PLMN IWU. In FIG. 7, for example, MS 4-1 moving from location 4-1$_3$ to location 4-1$_4$ is handed over via 41-3 from the private network P-BTS 27-1 to the public network MSC/BSS (17-1/5-1) via the PLMN IWU 39.

Figure 9:
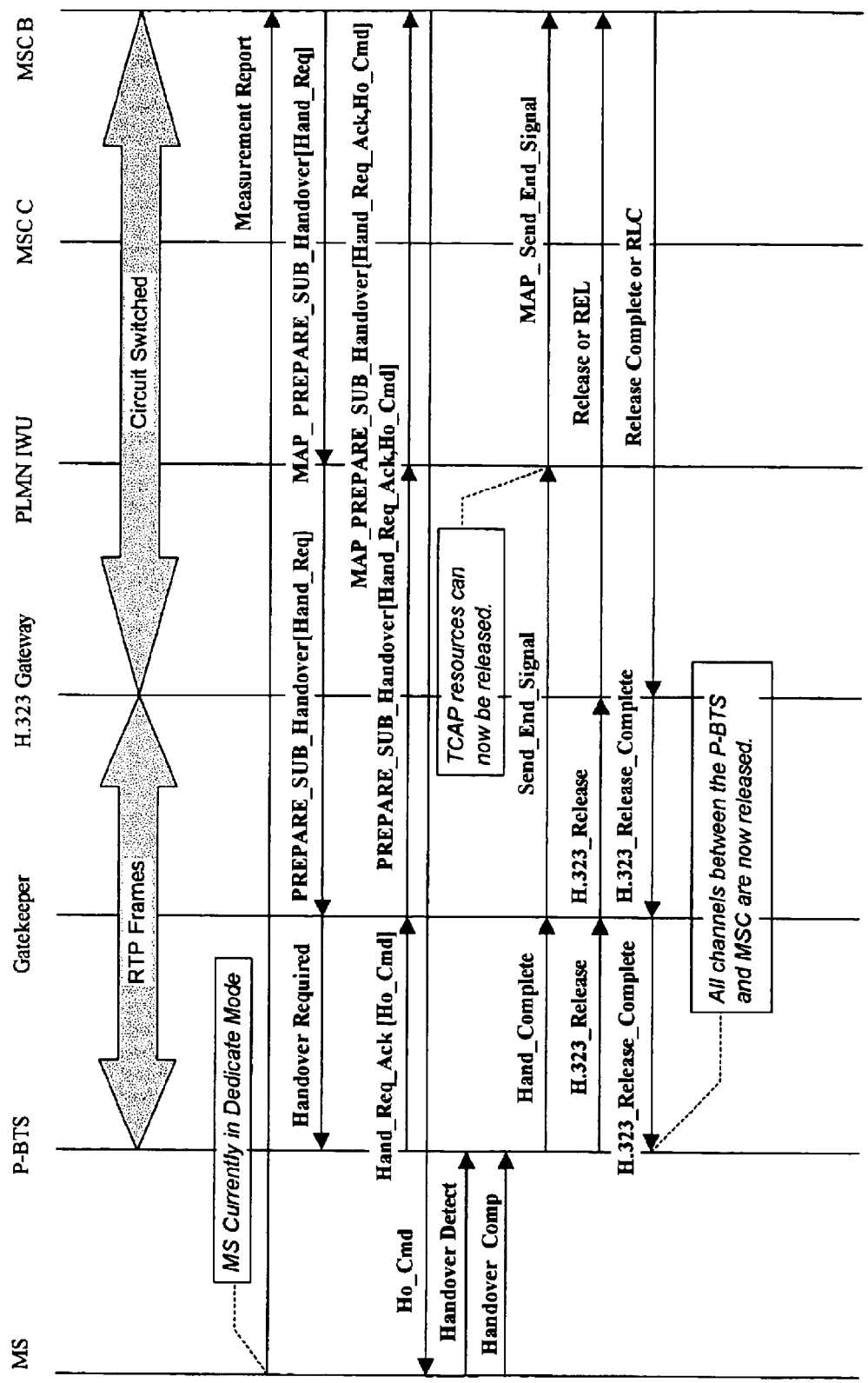
FIG. 9 depicts the call flows of a back handover (handback) of an MS from a public network MSC/BSS to a private network P-BTS via the PLMN IWU where the MS previously originated in the private network P-BTS.

FIG. 9 depicts the call flows of a back handover (handback) of an MS from a public network MSC/BSS to a private network P-BTS via the PLMN IWU where the MS previously originated in the private network P-BTS. In FIG. 7, for example, MS 4-1 moving from location 4-1$_3$ to location 4-1$_4$ is handed back via 41-4 from the public network MSC/BSS (17-1/5-1) to the private network P-BTS 27-1 via the PLMN IWU 39.

Figure 10:
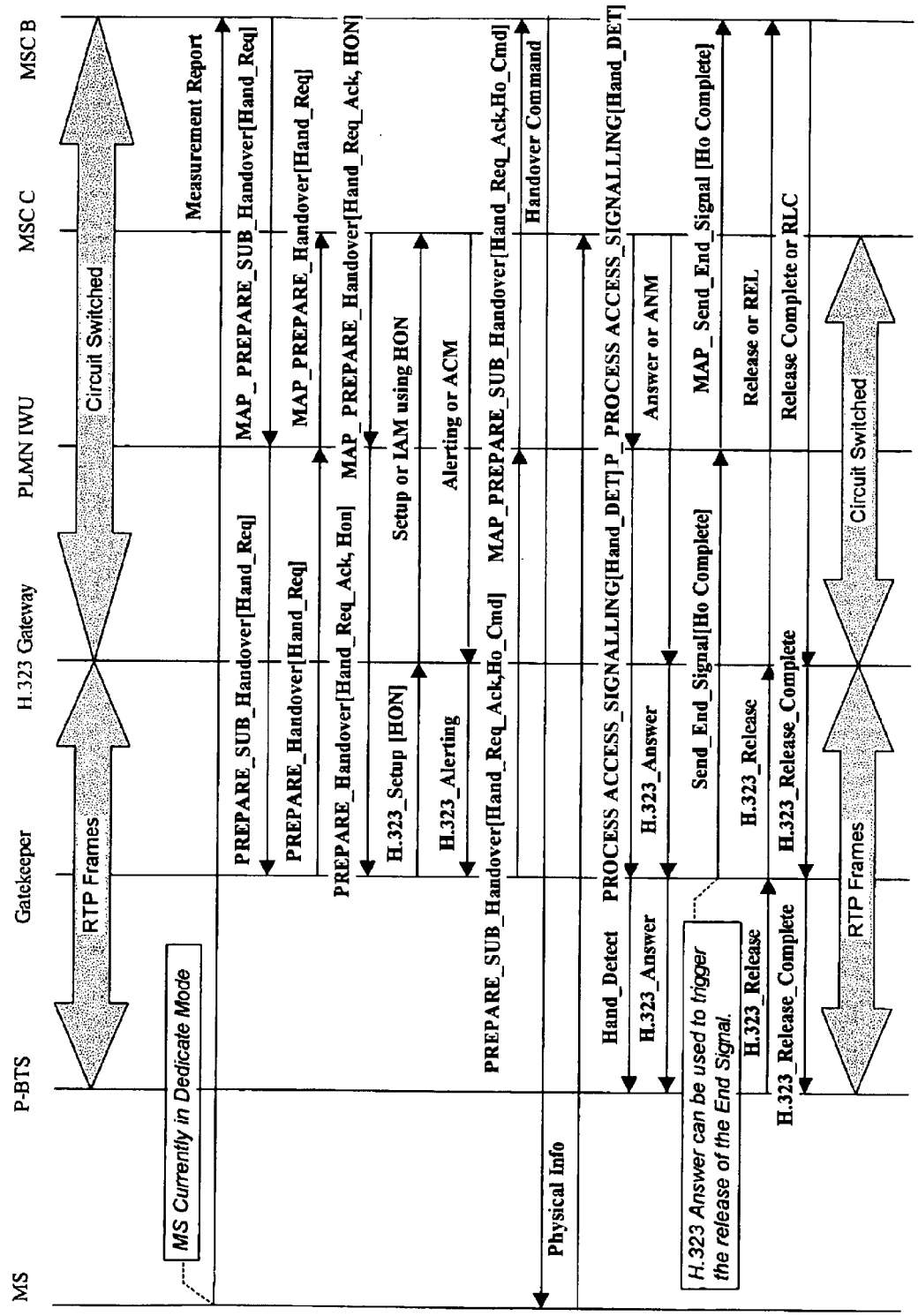
FIG. 10 depicts the call flows of a subsequent handover of an MS via the PLMN IWU from one MSC/BSS to another MSC/BSS in the public network where the MS originated with a P-BTS in the private network.

FIG. 10 depicts the call flows of a subsequent handover of an MS via the PLMN IWU from one MSC/BSS to another MSC/BSS in the public network where the MS originated with a P-BTS in the private network. In FIG. 7, for example, MS 4-1 moving from location 4-1$_4$ to location 4-1$_{5'}$ is handed over via 41-4' from the public network MSC/BSS (17-1/5-1) to public network MSC/BSS (17-2/5-2) via the PLMN IWU 39.

Figure 11:
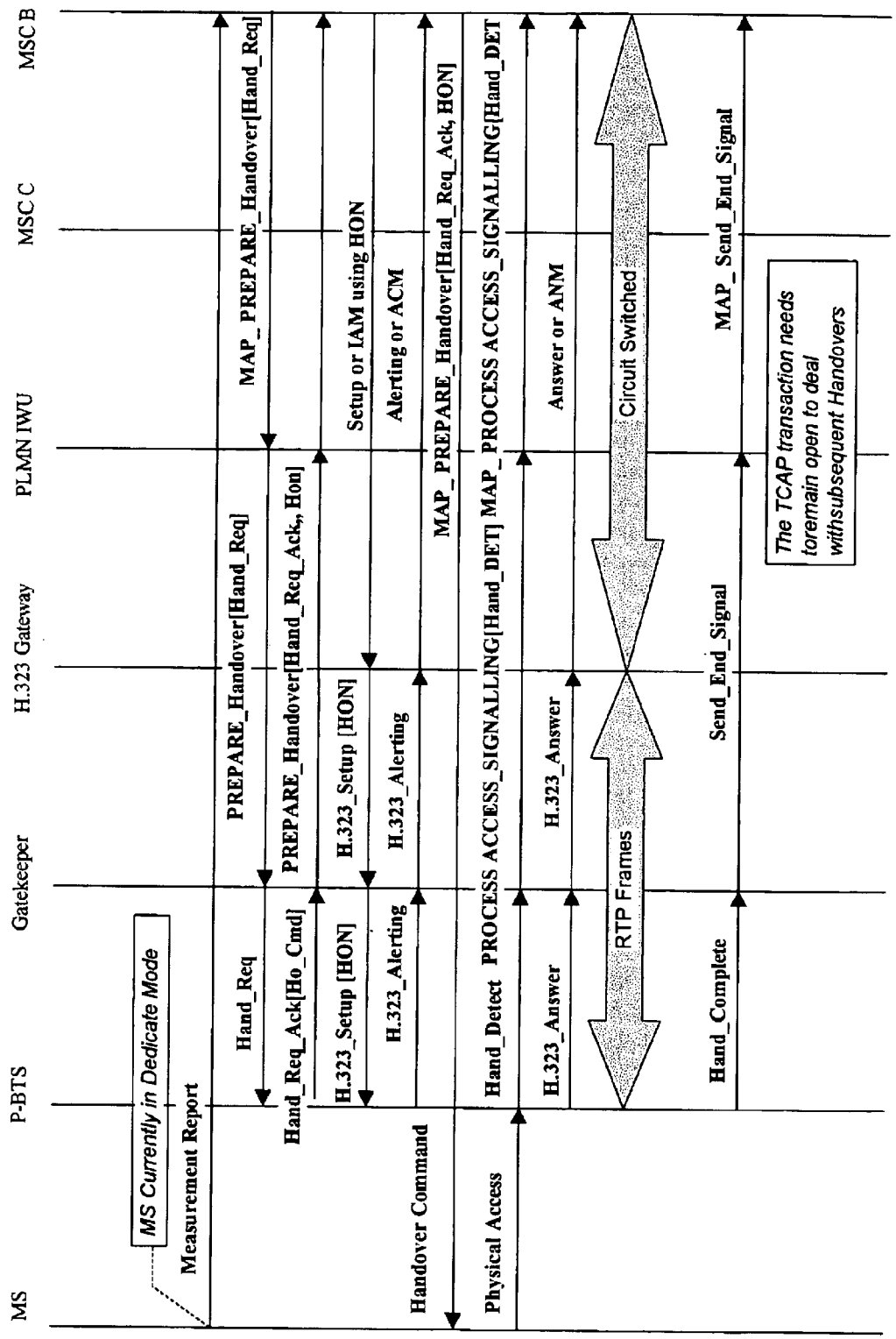
FIG. 11 depicts the call flows of a handover of an MS from the public network MSC/BSS to a private network P-BTS via the PLMN IWU.

FIG. 11 depicts the call flows of a handover of an MS from the public network MSC/BSS to a private network P-BTS via the PLMN IWU. In FIG. 7, for example, MS 4-2 moving from location 4-2$_1$ to location 4-2$_2$ is handed over via 40-1 from the public network MSC/BSS (17-2/5-2) to the private network P-BTS 27-3 via the PLMN IWU 39.

Figure 12:
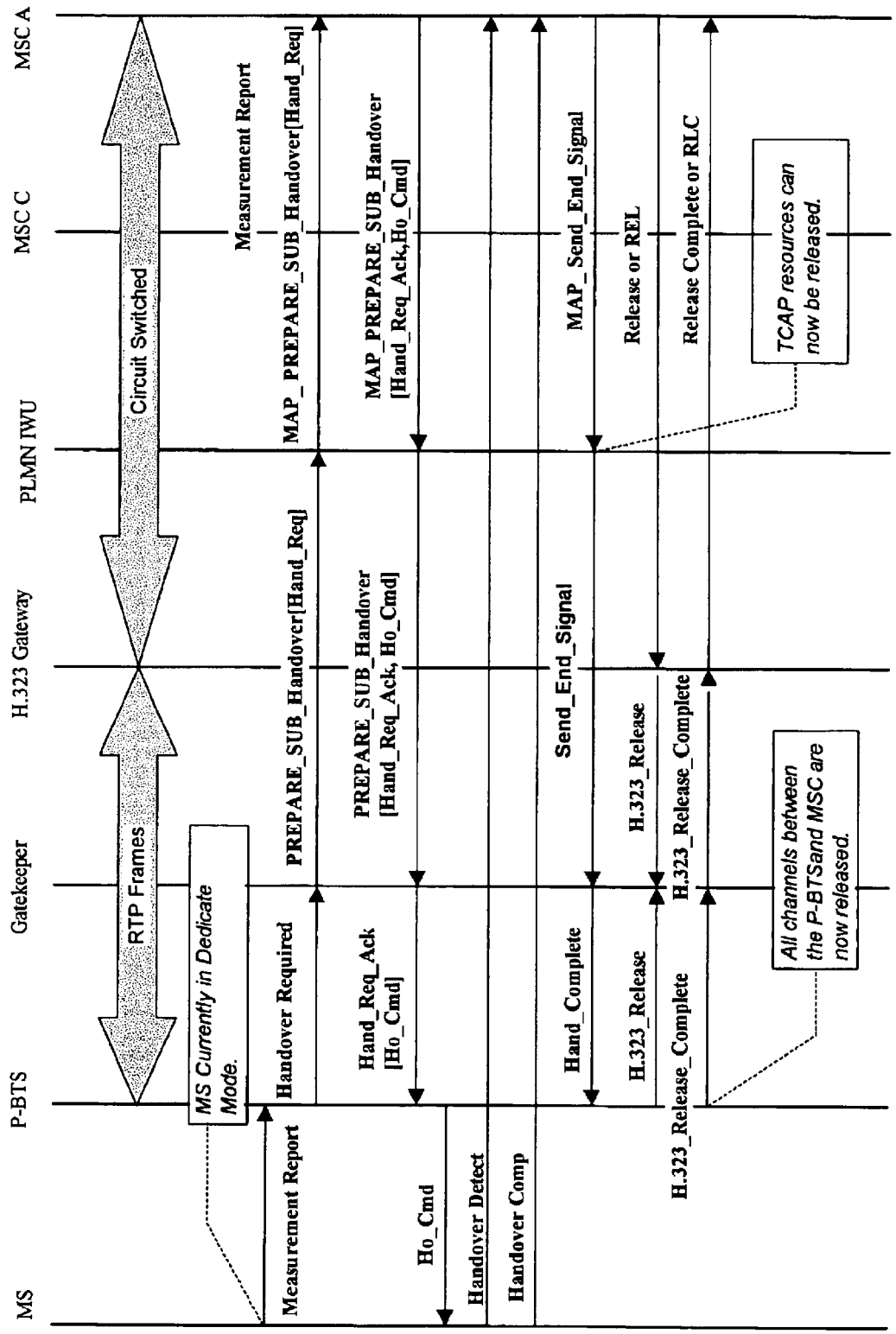
FIG. 12 depicts the call flows of a back handover (handback) of an MS from a private network P-BTS to a public network MSC/BSS via the PLMN IWU where the MS originated with the public network MSC/BSS.

FIG. 12 depicts the call flows of a back handover (handback) of an MS from a private network P-BTS to a public network MSC/BSS via the PLMN IWU where the MS originated with the public network MSC/BSS. In FIG. 7, for example, MS 4-2 moving from location 4-2$_2$ to location 4-2$_3$ is handed back via 40-2 from the private network P-BTS 27-3 to the public network MSC/BSS (17-2/5-2) via the PLMN IWU 39.

Figure 13:
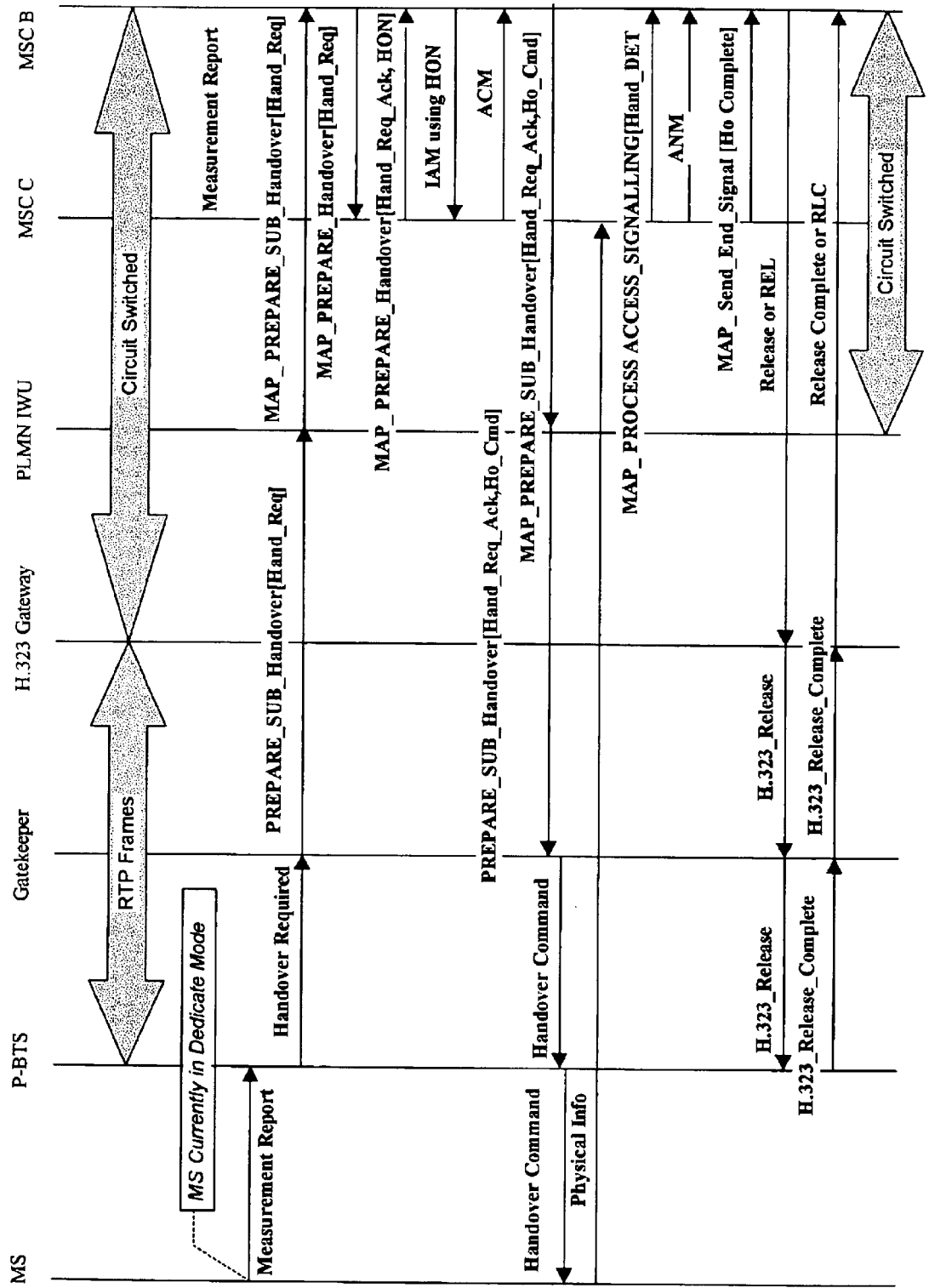
FIG. 13 depicts the call flows of a handover of an MS via the PLMN IWU from an old target P-BTS in the private network to a new MSC/BSS in the public network where the MS originated with an old MSC/BSS in the public network.

FIG. 13 depicts the call flows of a handover of an MS via the PLMN IWU from an old target P-BTS in the private network to a new MSC/BSS in the public network where the MS originated with an old MSC/BSS in the public network. In FIG. 7, for example, MS 4-2 moving from location 4-2$_2$ to location 4-2$_{3'}$ is handed over via 40-2' from the private network P-BTS 27-3 to the public network MSC/BSS (17-1/5-1) via the PLMN IWU 39.

Anchor and Target Private Network Handover Operations—FIG. 14–FIG. 19.

Operations that involve handovers from an anchor P-BTS to a target P-BTS (Anchor-to-Target1) in the private wireless network 22 of FIG. 7, for example, are represented in the call flows of FIG. 14 through FIG. 28.

FIG. 14 depicts the call flows of one method of implementing an anchor P-BTS to target P-BTS private-to-private handover (Anchor-to-Target1). In FIG. 7, for example, mobile station 4-1 is initially at a location indicated by 4-1$_1$ in the coverage area 411-1 serviced by the anchor P-BTS 27-1. Then, the mobile station 4-1 moves from the location indicated by 4-1$_1$ in the coverage area 411-1 to the coverage area 411-2 at location 4-1$_2$ serviced by the target P-BTS 27-2 (Target1) and a private-to-private handover procedure represented by arrow 41-1 occurs handing over from anchor P-BTS 27-1 to target P-BTS 27-2.

In order to provide continuous coverage within the private domain (Intranet), it is necessary to be able to perform at least intra-domain and inter-domain handovers. In order to simplify the implementation of the network, the P-BTS performs the handover candidate calculations on the measurement data being sent by the mobile station. Once a handover candidate has been identified and the decision made, then the process to begin the handover needs to be started. There are two methods used to facilitate the handover process. One method uses the conference facilities of H.323 and the resources of the gatekeeper 41 and multiconference unit (MCU) 45 to bridge the old P-BTS and the target P-BTS. Another method uses the multicast options of the Intranet to send the uplink and downlink IP packets to both the old and new P-BTSs. In either case, the target P-BTS enables the new radio interface, prepares to take over the mobile station Call Control state machine and establishes the necessary routing to access the network. Once the new radio channel has been established, the terminal is instructed to move to the new P-BTS and the old P-BTS resources are released. If each P-BTS used a different LAI, then location updating (registration) is automatically performed when the call terminates. In performing the handover as shown In FIG. 14, the following phases are undertaken:

Phase 1: Once the handover algorithm has determined that a handover is required then the transport addresses of the new base station must be determined. The new base station address is determined by making use of the RAS Location Request with the BTS ID as the addressed party. When appropriate this operation is extended to include the locations of BTSs within the Public GSM network.

Phase 2: If the gatekeeper knows the transport addresses of the Target BTS (EP3) then it is returned in the Location Confirm (LCF) message. At this point the Old BTS (EP1) must request the resources from the Target BTS. The resource request is performed by adding a new "Non-Standard Message" to the H.323 repertoire. This new message requests the resources from the Target BTS. This message may also include call control information appropriate to this mobile station. In addition, to speed up the location updating process, it may also include the Old BTSs copy of the user data. In the case of a handover to the Public network then the "Non-Standard Message" would have to be sent to the gateway and converted into the appropriate Handover message for the public network. The gateway would also have to start handling the call for the Old BTS.

Phase 3: When the Target BTS receives the request for the resources, if they are available then it will respond with a confirmation and a multicast address to be used by the Old BTS.

Phase 4: Upon receiving the confirmation the Old BTS begins to establish a conference between the destination BTS (EP2) or Fixed Terminal and the Target BTS. Once the multicast distributed conference has been established the Old BTS can instruct the mobile station to handover to the Target BTS.

Phase 5: The Handover Command is sent to the mobile station which will then begin to access the Target BTS on the indicated timeslot. Once the mobile station is established on the Target BTS an End Session message is sent to the Old BTS to release the resources from the BTS. The Call Control is now located on the Target BTS.

In order to accommodate different handover cases, the P-BTS determines via the BTS ID whether Synchronized or Non-synchronized handover is to be used.

It should be noted that this procedure is equally applicable to both Private and Public mobile stations. This procedure also forms the basis for any scheme which requires handover to/from the Public GSM network.

Figure 15:
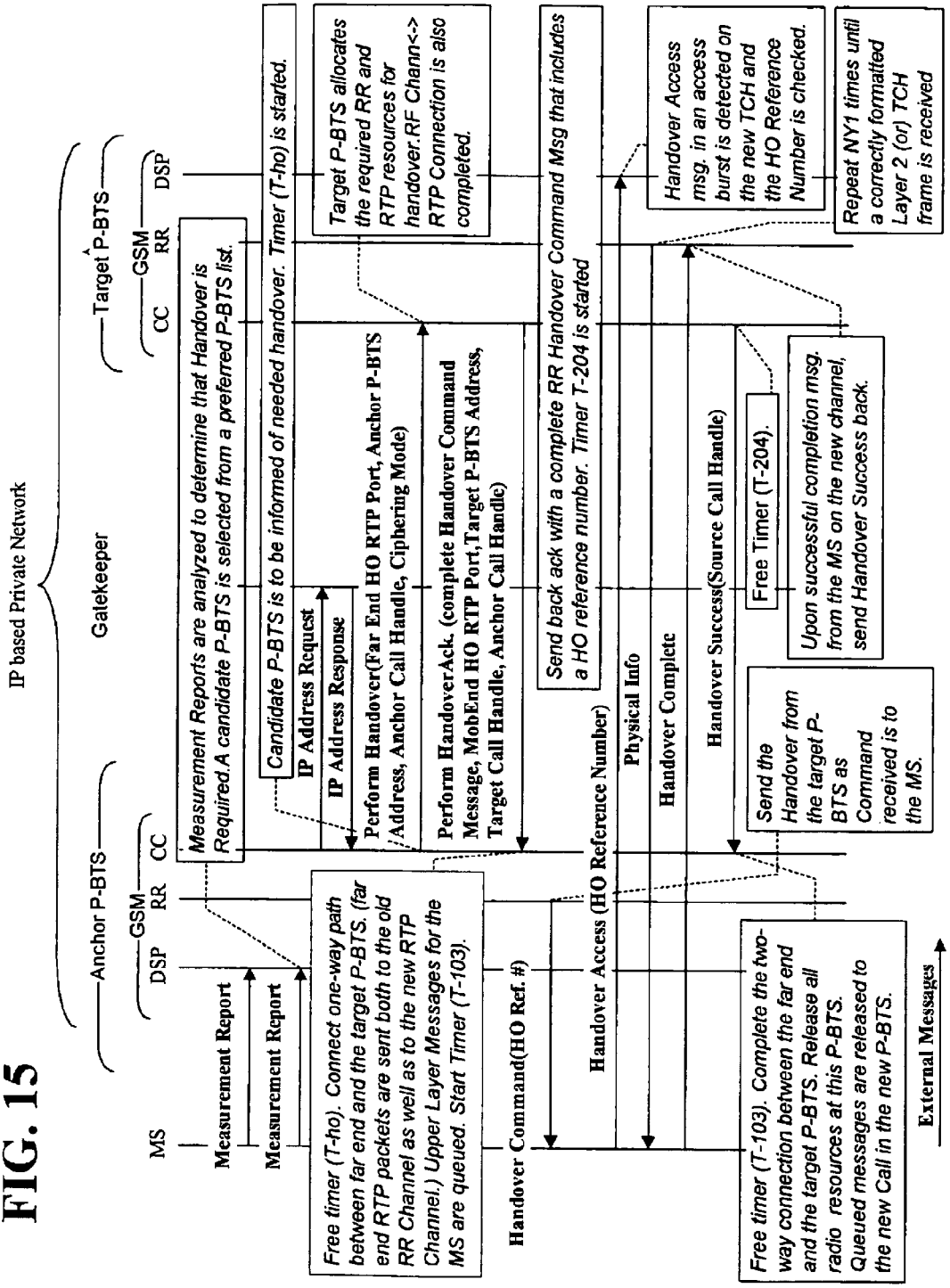
FIG. 15 depicts the handover call flows of a MS handover between an anchor P-BTS and a target P-BTS (Anchor-to-Target1).

FIG. 15 depicts the call flows of a second method of implementing the handover call flows of a MS private-to-private handover between an anchor P-BTS and a target P-BTS (Anchor-to-Target1). In FIG. 7, for example, mobile station 4-1 is initially at a location indicated by 4-1$_1$ in the coverage area 411-1 serviced by the anchor P-BTS 27-1. Then, the mobile station 4-1 moves from the location indicated by 4-1$_1$ in the coverage area 411-1 to the coverage area 411-2 at location 4-1$_2$ serviced by the target P-BTS 27-2 (Target1) and a private-to-private handover procedure represented by arrow 41-1 occurs handing over from anchor P-BTS 27-1 to target P-BTS 27-2. In this second method of a private-to-private handover, the first phase is the same as that described for the first method. The "IP Address Request" from the anchor P-BTS to the gatekeeper used in the call flow is essentially equivalent to a Location Request. In the second phase, after receiving the target P-BTS's IP Address from the gatekeeper, the anchor P-BTS assigns an RTP Port for handover connection (Far End HO RTP Port) and then requests resources from the target P-BTS through a "Perform Handover" message. In the third phase, the target sends a confirmation (Ack.) if resources are available. Local resources assigned include a new radio channel as well as an RTP Port for handover connection (Mob End HO RTP Port). Target P-BTS also completes its side of the two-way handover traffic connection between the two handover RTP Ports and also completes a two-way connection between its handover RTP port and the locally assigned radio (GSM) port. In the fourth phase, when the confirmation is received, the anchor P-BTS commands the mobile station to the new radio channel, completes its side of the two-way handover traffic connection between the two handover RTP Ports and also makes a one-way connection from the far end (remote) port to its handover RTP Port. Note that this far end (remote) port can be a radio (GSM) port or an RTP port. In the final fifth phase, when the mobile station successfully completes access to the target P-BTS over the new radio channel, a Handover Success message is sent to the anchor P-BTS. The anchor P-BTS then releases the old radio channel resources and completes the two-way connection between the far end (remote) port and its handover RTP Port.

Figure 16:
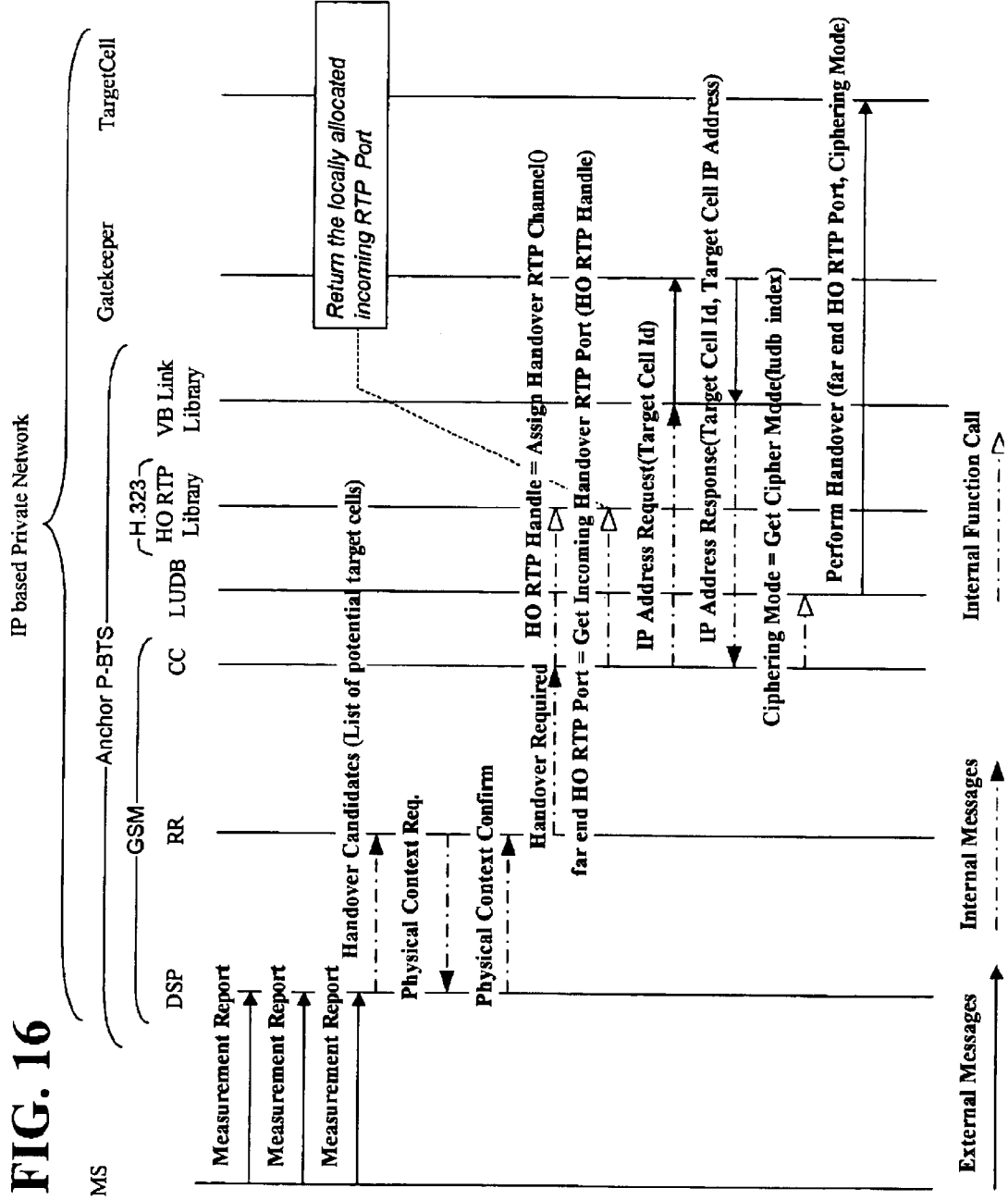
FIG. 16 depicts the anchor P-BTS handover internal call flows of the anchor P-BTS in the FIG. call flow (Anchor-to-Target1).

FIG. 16 depicts the anchor P-BTS handover internal call flows of the anchor P-BTS in the FIG. 15 call flow (Anchor-to-Target1).

Figure 17:
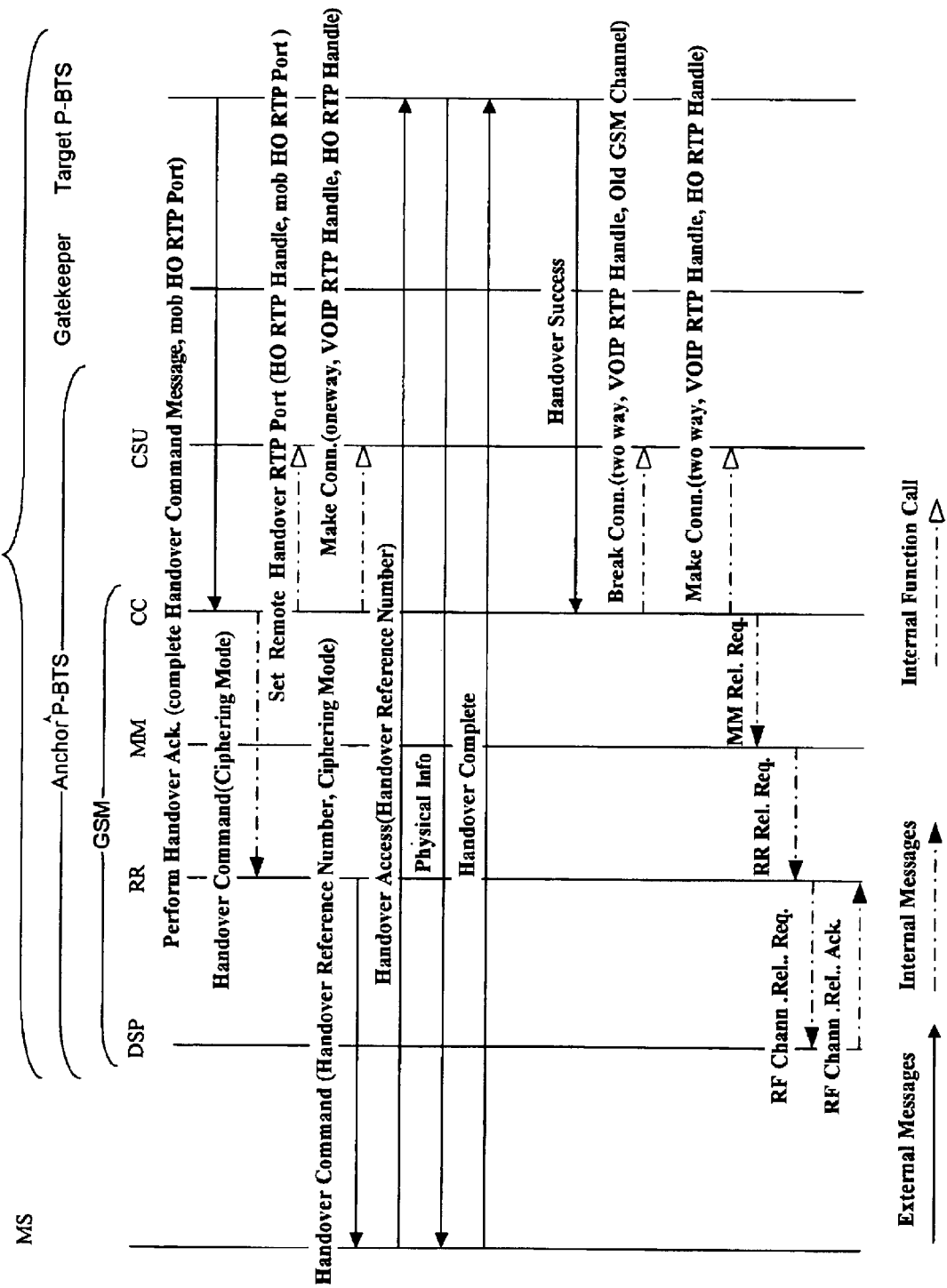
FIG. 17 depicts a continuation of the anchor P-BTS handover internal call flows of FIG. 16 (Anchor-to-Target1).

FIG. 17 depicts a continuation of the anchor P-BTS handover internal call flows of FIG. 16 (Anchor-to-Target1).

Figure 18:
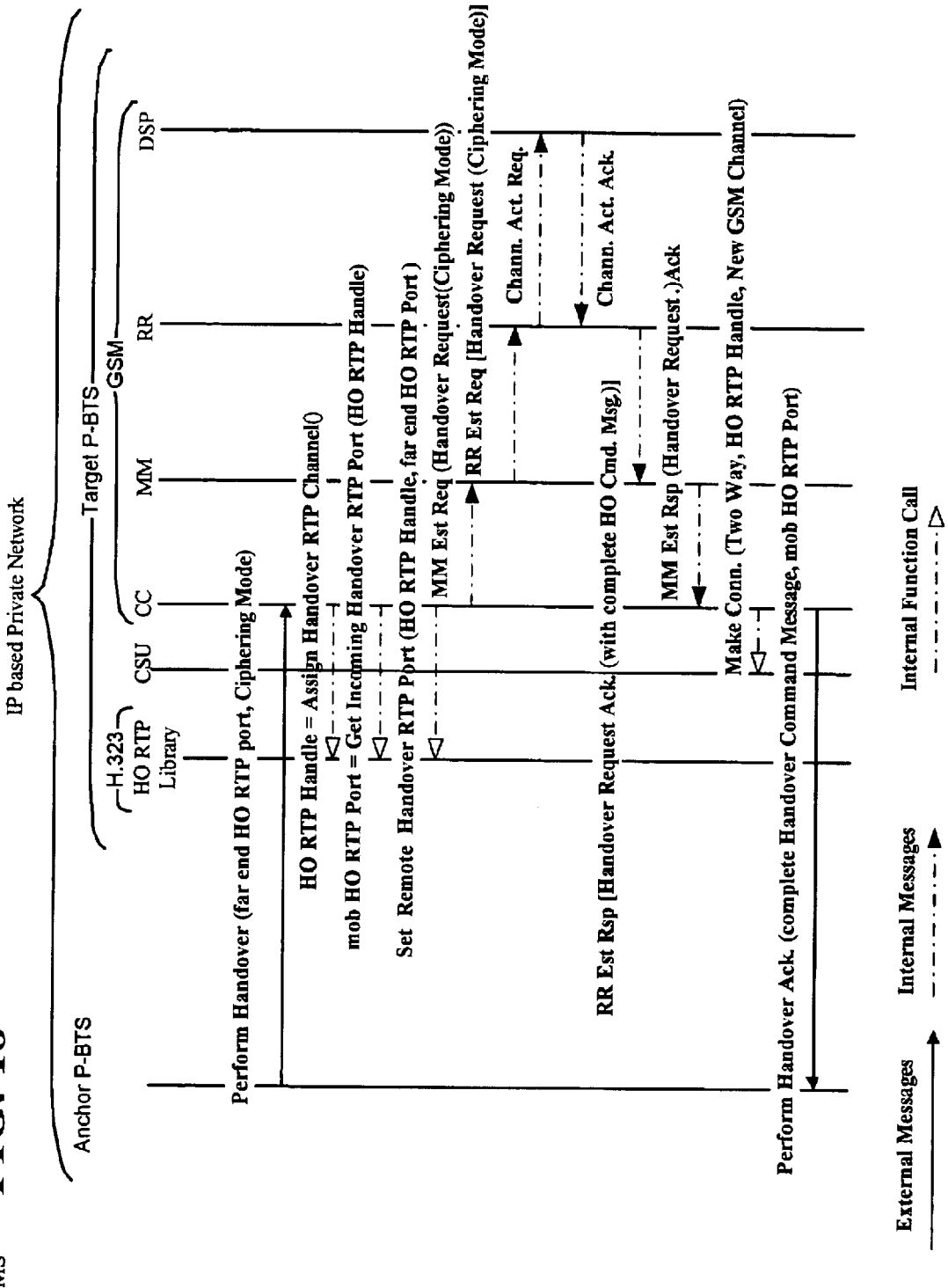
FIG. 18 depicts the handover target P-BTS internal call flows of the target P-BTS in the FIG. 15 call flow (Anchor-to-Target1).

FIG. 18 depicts the handover target P-BTS internal call flows of the target P-BTS in the FIG. 15 call flow (Anchor-to-Target1).

Figure 19:
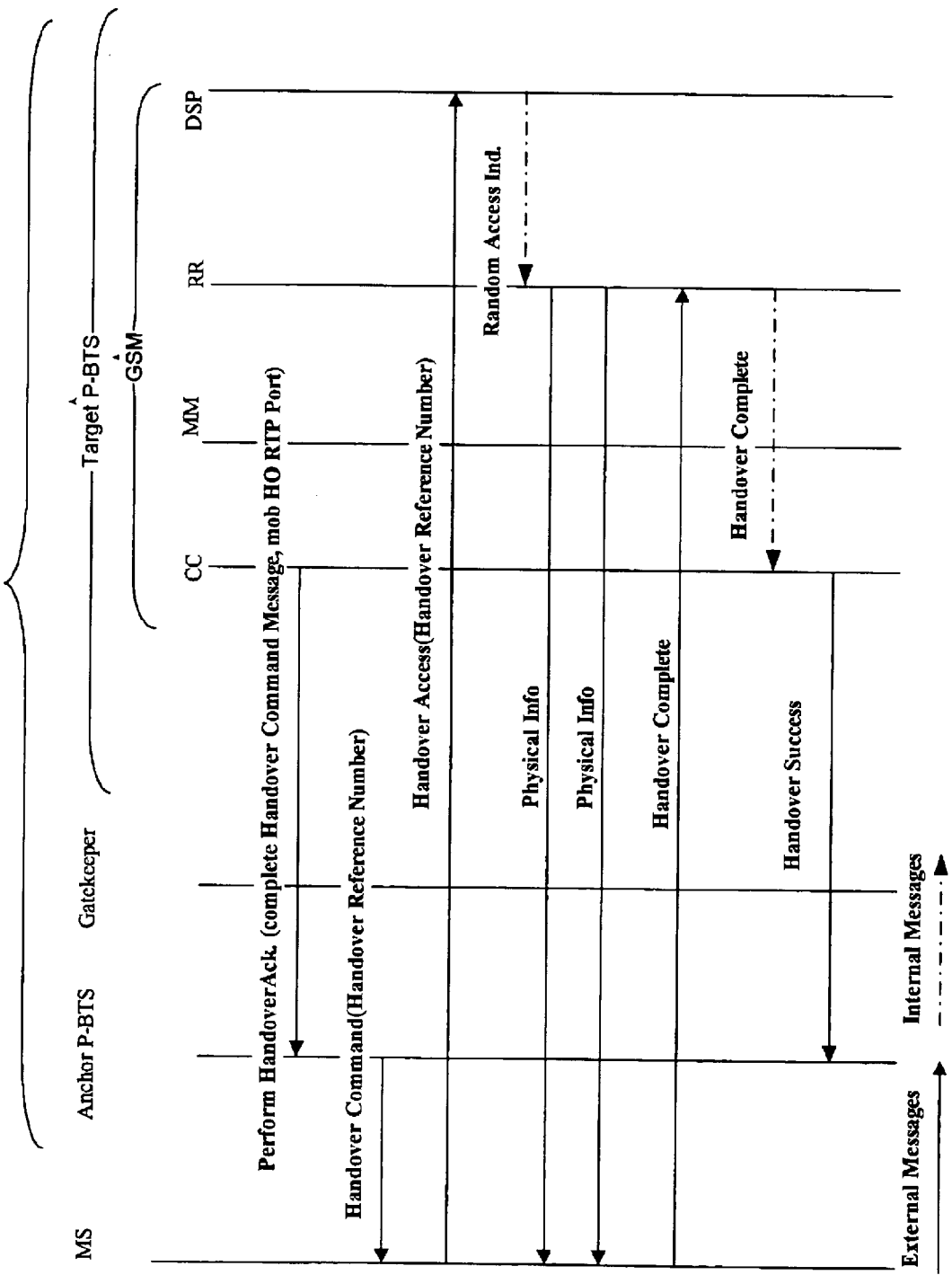
FIG. 19 depicts a continuation of the target P-BTS handover internal call flows of the FIG. 18 call flow (Anchor-to-Target1).

FIG. 19 depicts a continuation of the target P-BTS handover internal call flows of the FIG. 18 call flow (Anchor-to-Target1).

Anchor and Target Private Network Back Handover Operations—FIG. 20–FIG. 24.

Figure 20:
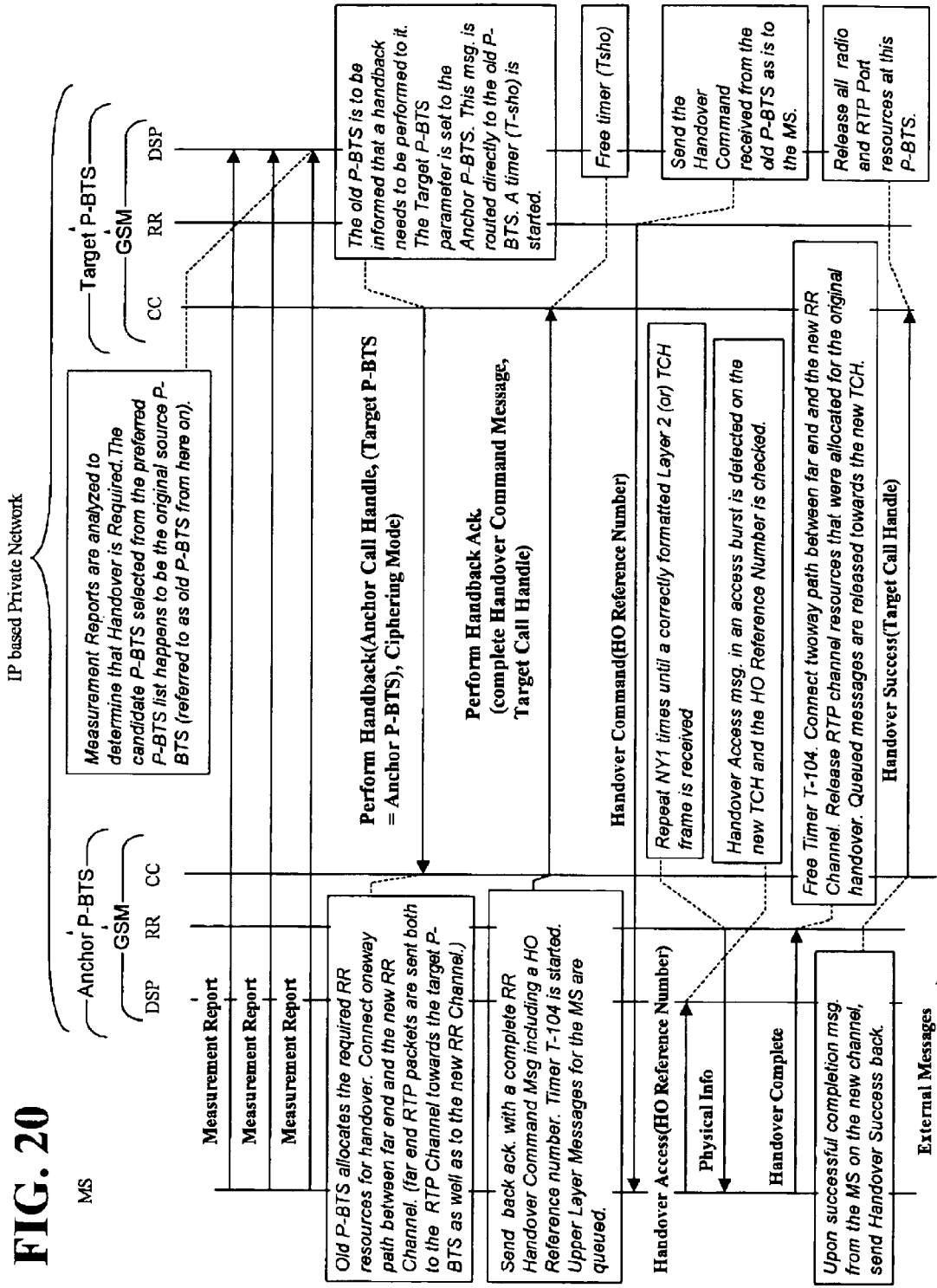
FIG. 20 depicts the back handover (handback) call flows of a MS subsequent back handover after a handover of the FIG. 15 call flow between an anchor P-BTS and a target P-BTS (Target1-to-Anchor).
Figure 21:
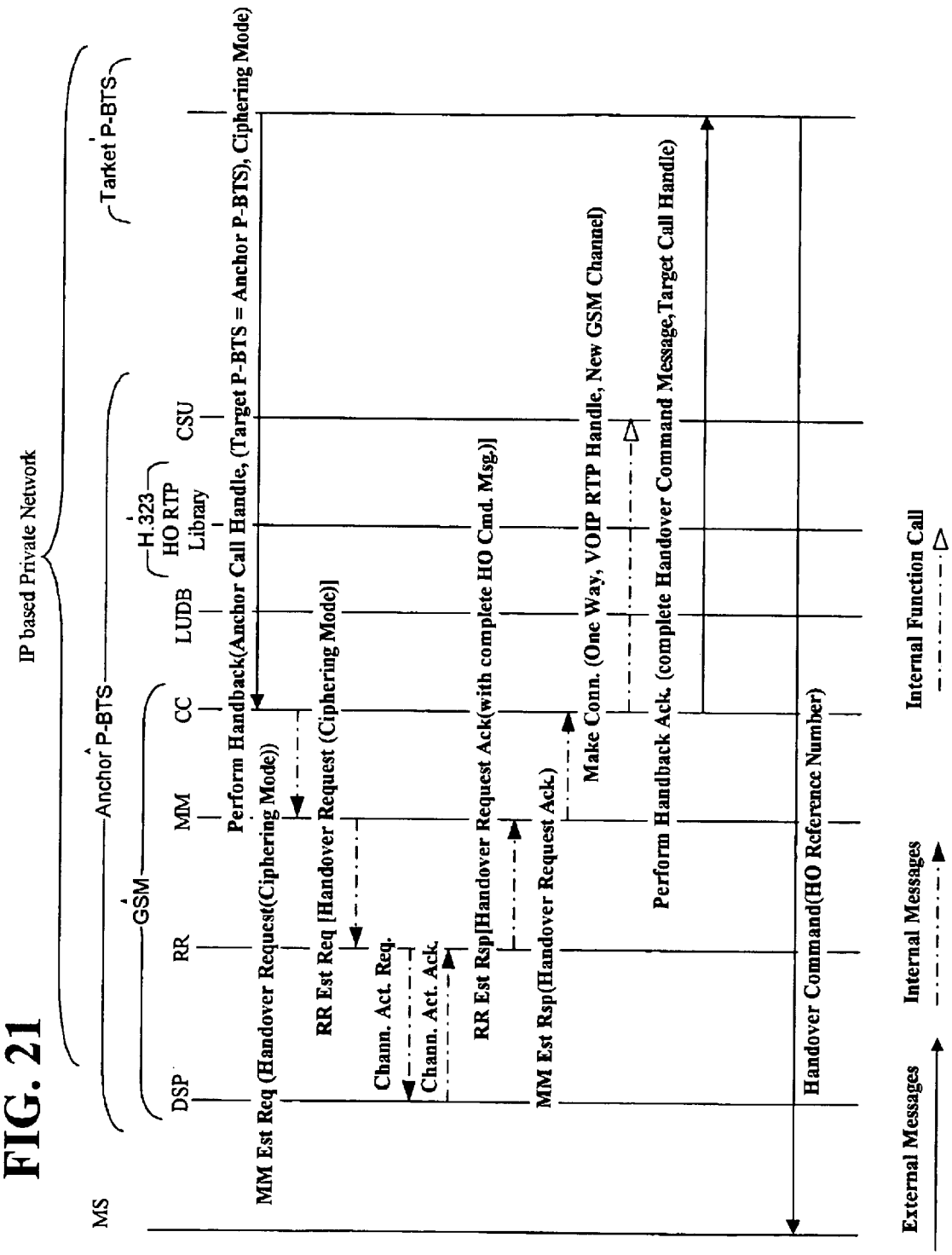
FIG. 21 depicts the anchor P-BTS back handover (handback) internal call flows of the anchor P-BTS in FIG. 20 (Target1-to-Anchor).
Figure 22:
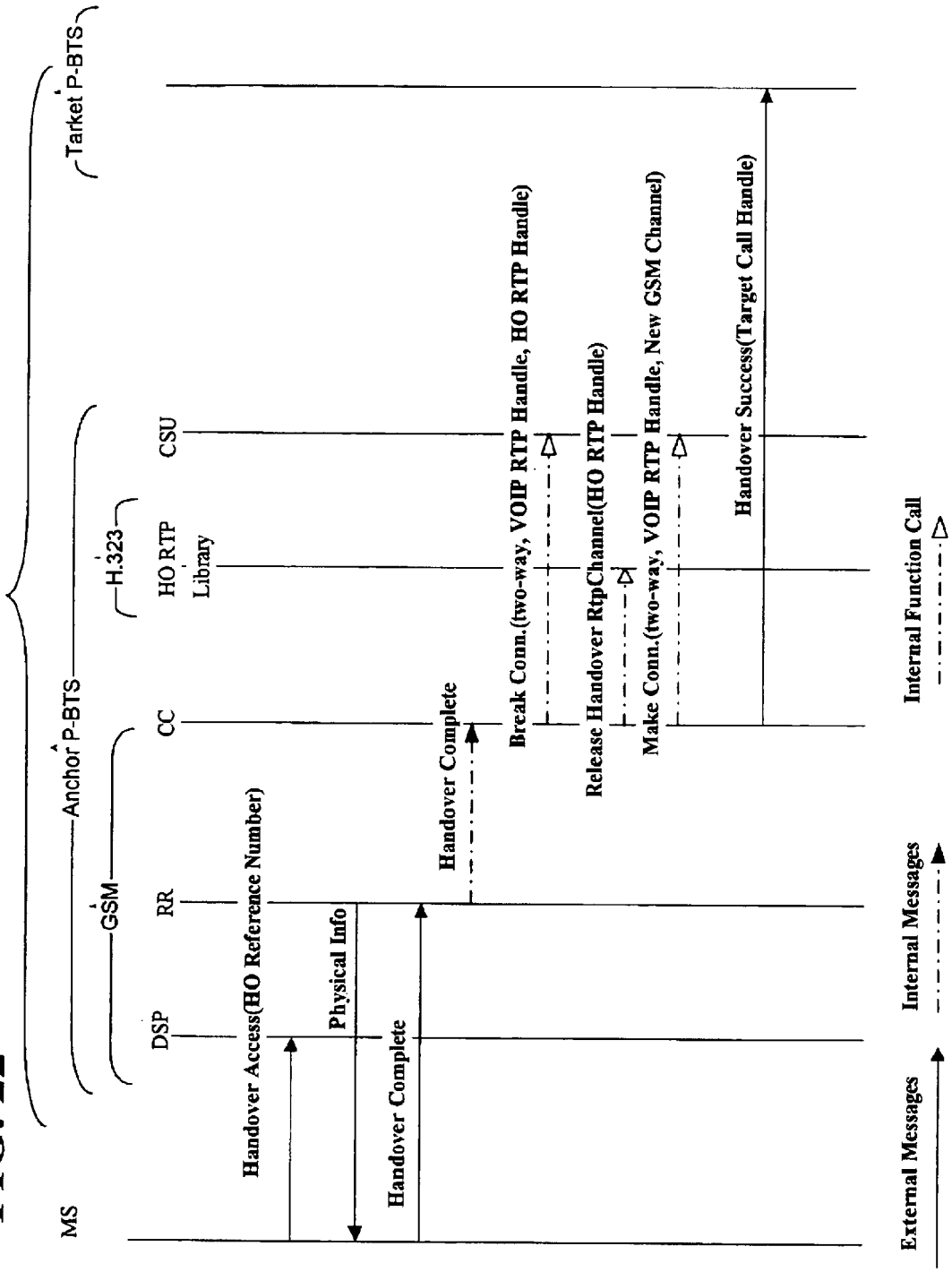
FIG. 22 depicts a continuation of the anchor P-BTS back handover (handback) internal call flows of FIG. 21 (Target1-to-Anchor).

Operations that involve back handovers (handbacks) from a target P-BTS to an anchor P-BTS (Target1-to-Anchor) in the private wireless network 22 of FIG. 7, for example, are represented in the call flows of FIG. 20 through FIG. 22.

FIG. 20 depicts the back handover (private-to-private handback) call flows of a MS subsequent back handover after a handover of the FIG. 15 call flow between an anchor P-BTS and a target P-BTS (Target1-to-Anchor). In the FIG. 7 example, the mobile station 4-1 moves back from the location indicated by 4-1$_2$ in the coverage area 411-2 serviced by the target P-BTS 27-2 to the location 4-1$_3$ in the coverage area 411-1 serviced by the anchor P-BTS 27-1 and a back handover (private-to-private handback) procedure (Target1-to-Anchor) represented by arrow 41-2 occurs handing back to anchor P-BTS 27-1. In the back handover (private-to-private handback) implementation, when a handback is required, the target P-BTS knows the anchor P-BTS address. In the first phase, the target P-BTS requests resources from the anchor P-BTS through a "Perform Handback" message. In the second phase, the anchor P-BTS sends a confirmation (Ack.) if resources are available. Local resources assigned include a new radio channel. The anchor P-BTS also completes a one-way connection from the far end (remote) port to the newly assigned radio (GSM) port. In the third phase, when the confirmation is received, the target P-BTS commands the mobile station to the new radio channel. In the final fourth phase, when the mobile station successfully completes access to the anchor P-BTS over the new radio channel, the anchor P-BTS completes the two-way connection between the far end (remote) port and the newly assigned radio (GSM) port and also sends a Handover Success message to the target P-BTS. The target P-BTS then releases the old radio channel resources. Both anchor and the target P-BTS also break the Handover RTP connection between them which is no longer required and also release their respective handover RTP Ports of that connection.

FIG. 21 depicts the anchor P-BTS back handover (handback) internal call flows of the anchor P-BTS in the FIG. 20 back handover (Target1-to-Anchor).

FIG. 22 depicts a continuation of the anchor P-BTS back handover internal call flows of FIG. 21 (Target1-to-Anchor).

Figure 23:
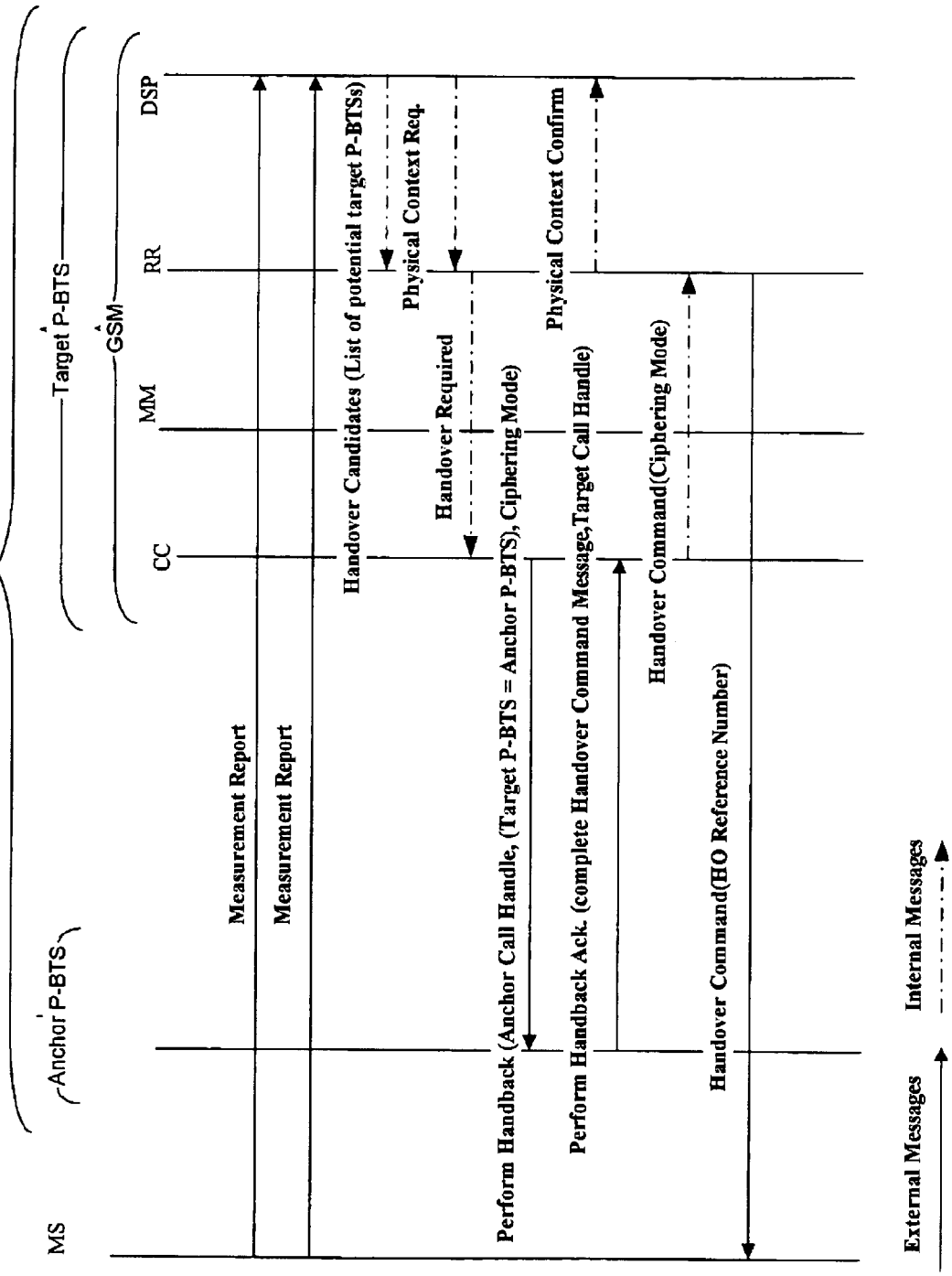
FIG. 23 depicts the target P-BTS back handover (handback) internal call flows of the FIG. 21 back handover (Target1-to-Anchor) and also depicts the target P-BTS handover to third where the handover is to a third target P-BTS (Target1-to-Target2).

FIG. 23 depicts the target P-BTS back handover (handback) internal call flows of the of the target P-BTS in the FIG. 20 back handover (Target1-to-Anchor).

Figure 24:
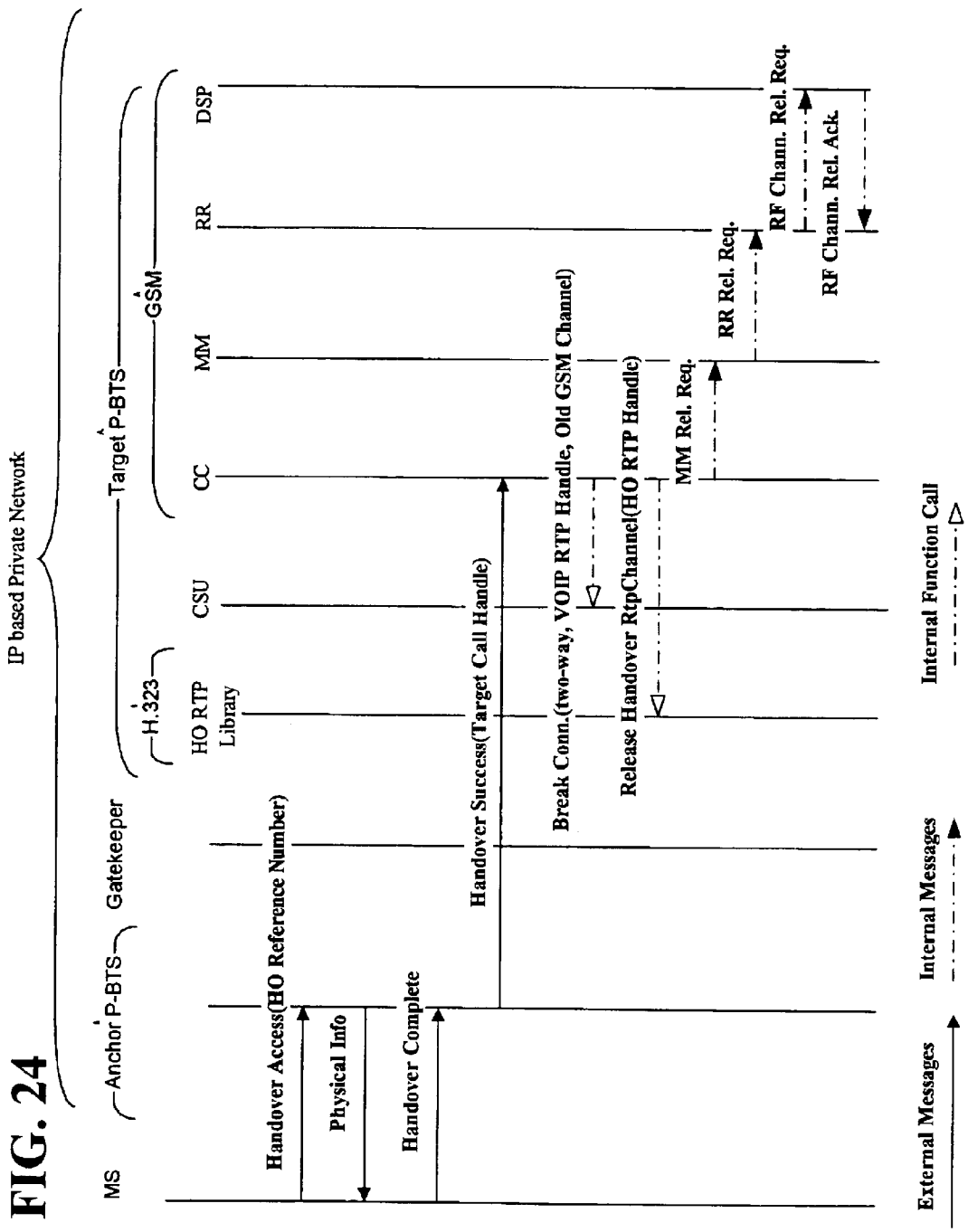
FIG. 24 depicts a continuation of the target P-BTS back handover (handback) internal call flows of FIG. 23 (Target1-to-Anchor).

FIG. 24 depicts a continuation of the target P-BTS back handover (handback) internal call flows of the FIG. 23 (Target1-to-anchor).

Anchor and Target Private Handover to Third P-BTS Operations—FIG. 25–FIG. 29,

Operations that involve private-to-private handovers from a target P-BTS to a third P-BTS (Target1-to-Target2) in the private wireless network 22 of FIG. 7, for example, are represented in the call flows of FIG. 25 through FIG. 29.

Figure 25:
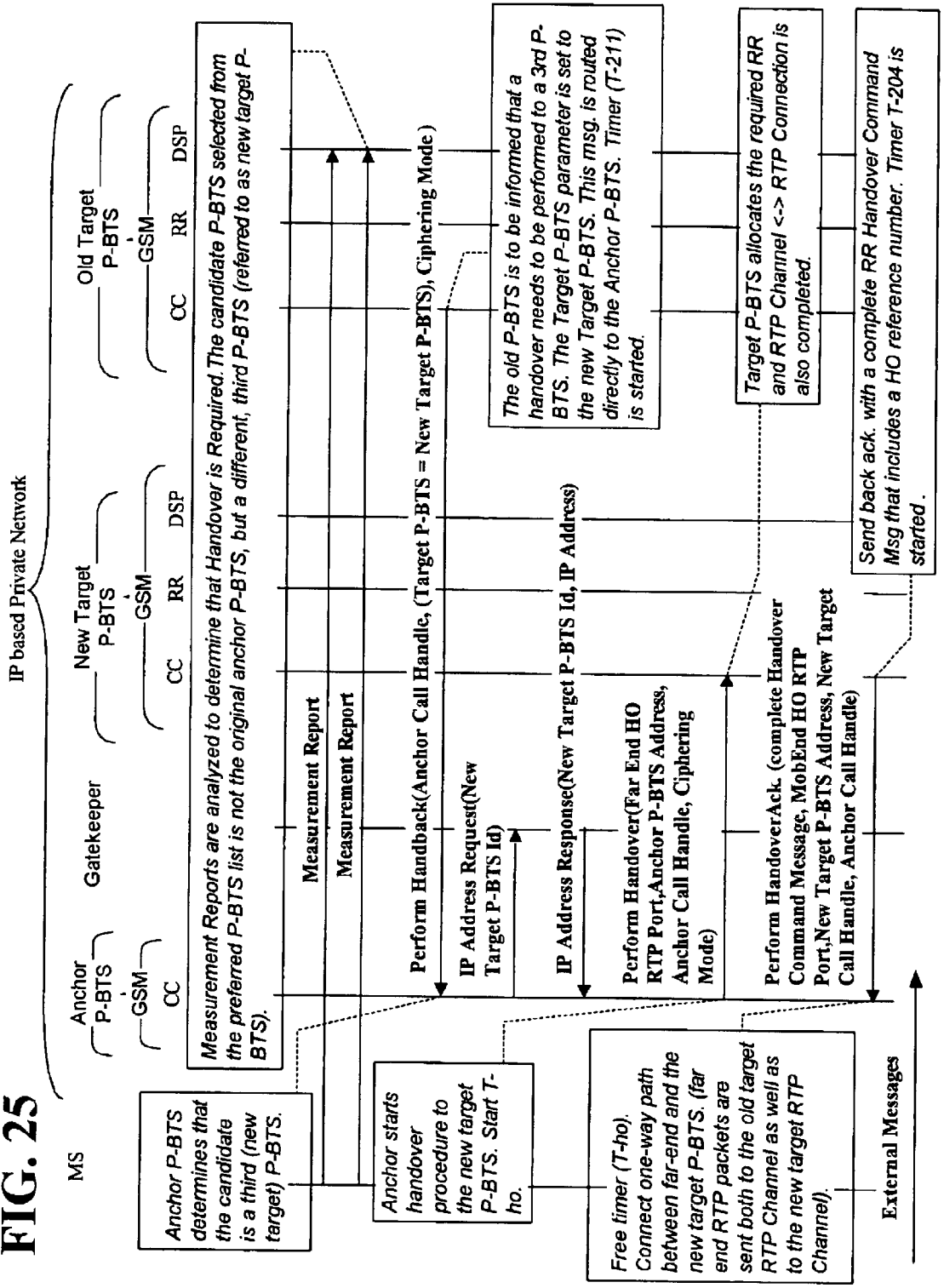
FIG. 25 depicts the handover to third call flows of a MS handover between an old target P-BTS and a new target P-BTS (Target1-to-target2).

FIG. 25 depicts the handover to third call flows of a MS handover between an old target P-BTS and a new target P-BTS (Target1-to-Target2). In the FIG. 7 example, the operation started with an Anchor-to-Target1 handover where mobile station 4-1 was initially at a location indicated by 4-1$_1$ in the coverage area 411-1 serviced by the anchor P-BTS 27-1. Then, the mobile station 4-1 moved from the location indicated by 4-1$_1$ in the coverage area 411-1 to the coverage area 411-2 at location 4-1$_2$ serviced by the target P-BTS 27-2 (Target1) and an Anchor-to-Target1 handover procedure represented by arrow 41-1 occurred handing over from anchor P-BTS 27-1 to target1 P-BTS 27-2. Then, the mobile station 4-1 moves from the location indicated by 4-1$_2$ in the coverage area 411-2 to the coverage area 411-3 at location 4-1$_3$, serviced by the target P-BTS 27-3 (Target2) and a Target1-to-Target2 handover to third procedure represented by arrow 41-2' occurs handing over to P-BTS 27-3 (Target2). This example demonstrates a private-to-private handover followed by a public-to-private handover to third. In the handover to third (private-to-private handover followed by a private-to-private handover to a third BTS) implementation, when a handover to a third P-BTS is required, in the first phase, the old target P-BTS requests for resources from the anchor P-BTS through a "Perform Handback" message including the name of the new target P-BTS. In the second phase, the anchor requests and gets the IP address for the new target P-BTS from the gatekeeper. In the third phase, the anchor assigns a new Handover RTP Port (new Far End HO RTP Port) and requests resources from the new target P-BTS through a "Perform Handover" message. In the fourth phase, the new target sends a confirmation (Ack.) if resources are available. Local resources assigned include a new radio channel as well as an RTP Port for handover connection (new Mob End HO RTP Port). The new target P-BTS also completes its side of the two-way handover traffic connection between its handover RTP Port and the new handover RTP Port on the anchor and also completes a two-way connection between its handover RTP port and the locally assigned radio (GSM) port. In the fifth phase, the anchor P-BTS completes its side of the two-way handover traffic connection between its new handover RTP Port and the handover RTP Port on the new target P-BTS and also completes a one-way connection from the far end (remote) port to the newly assigned handover RTP Port and sends a confirmation (Ack.) back to the old target P-BTS. In the sixth phase, when the confirmation is received, the old target P-BTS commands the mobile station to the new radio channel. In the seventh phase, when the mobile station successfully completes access to the new target P-BTS over the new radio channel, a Handover Success message is sent to the anchor P-BTS. In the final eighth phase, the anchor P-BTS in turn sends a Handover Success message to the old target P-BTS and also completes the two-way connection between the far end (remote) port and the newly assigned handover RTP Port. The old target P-BTS then releases the old radio channel resources. Both the anchor P-BTS and the old target P-BTS also break the Handover RTP connection between them which is no longer required and also release their respective handover RTP Ports of that connection.

Figure 26:
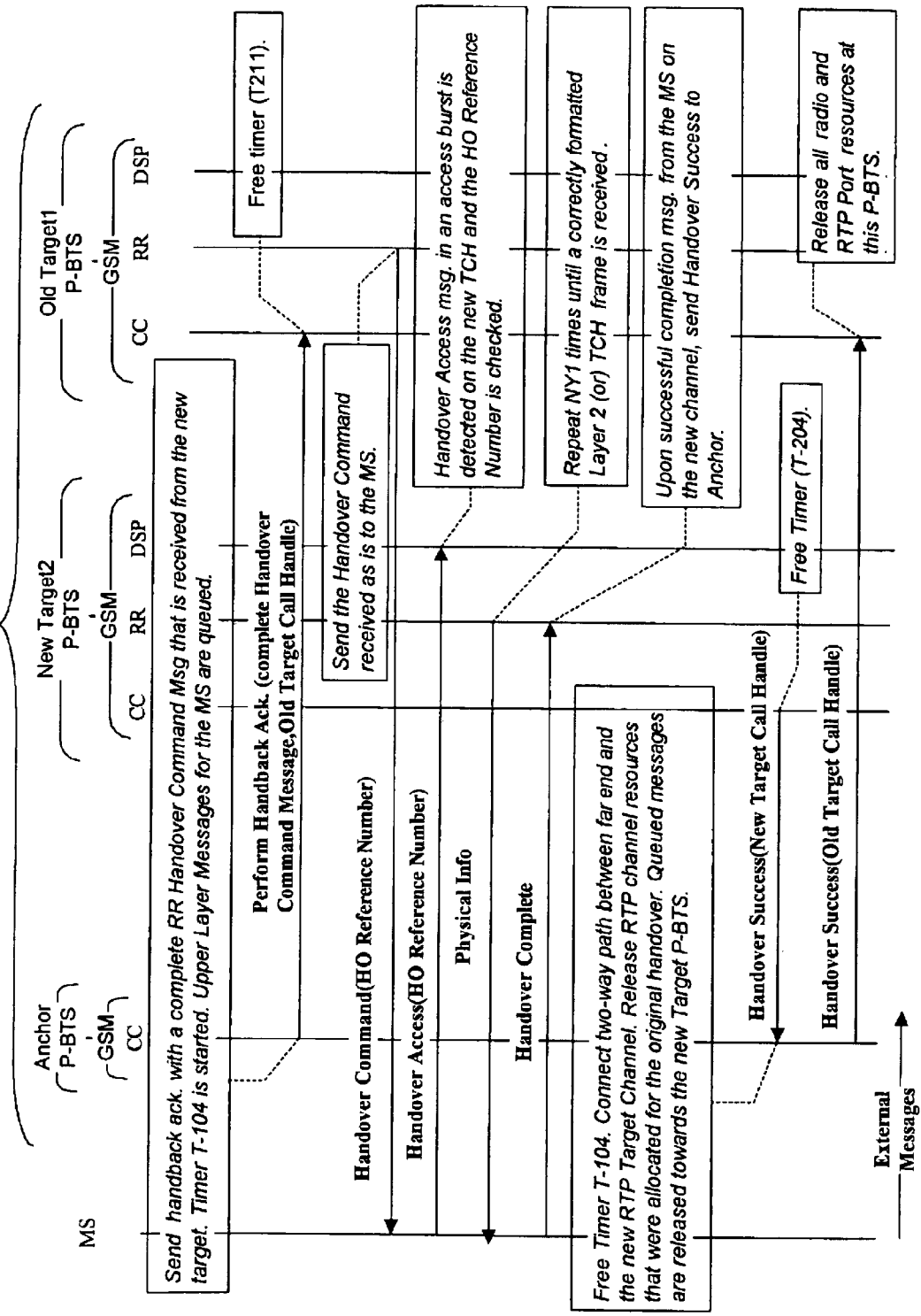
FIG. 26 depicts a continuation of the MS handover to third of FIG. 25 (Target1-to-Target2).

FIG. 26 depicts a continuation of the MS handover to third of FIG. 25 (Target1-to-Target2).

Figure 27:
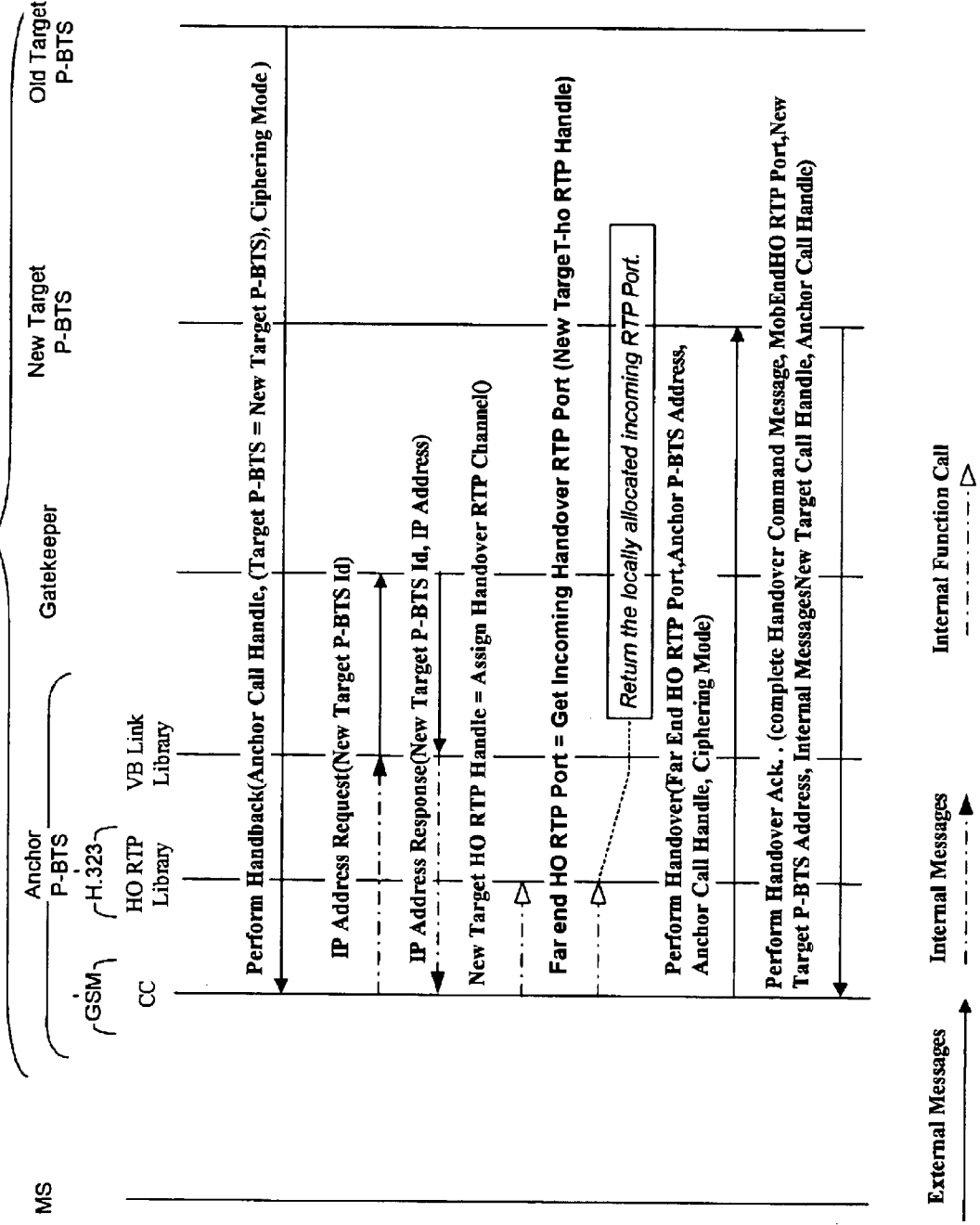
FIG. 27 depicts the anchor P-BTS handover internal call flows of the anchor P-BTS of the FIG. handover to third (Target1-to-Target2).

FIG. 27 depicts the anchor P-BTS handover internal call flows of the anchor P-BTS of the FIG. 25 handover to third (Target1-to-Target2).

Figure 28:
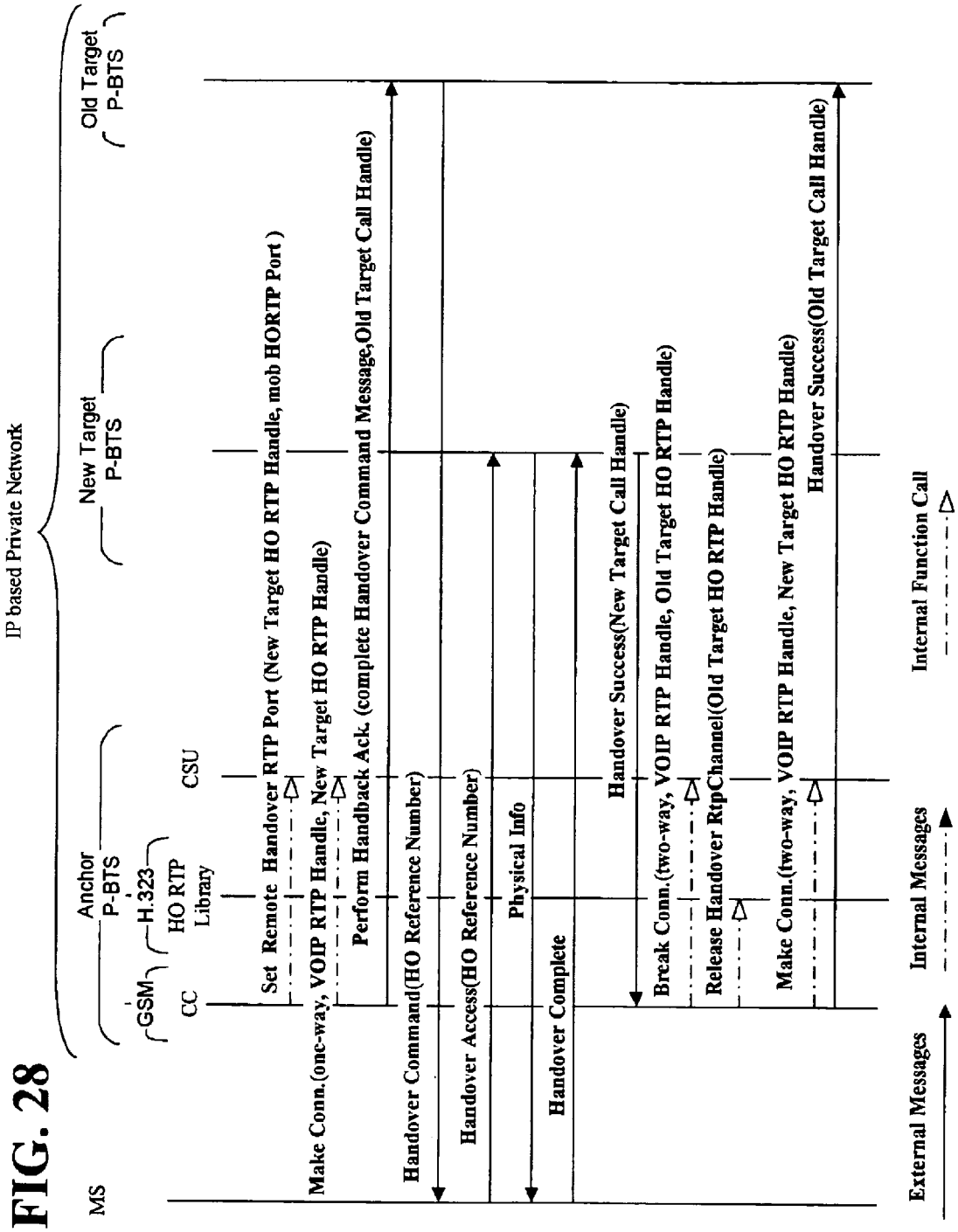
FIG. 28 depicts a continuation of the anchor P-BTS handover internal call flows of FIG. 27 handover to third (Target1-to-Target2).

FIG. 28 depicts a continuation of the anchor P-BTS handover internal call flows of FIG. 27 handover to third (Target1-to-Target2).

FIG. 29 depicts a continuation of the target P-BTS handover to third internal call flows where the initial internal call flows for the target P-BTS are the same as the handback call flows of FIG. 23 (Target1-to-Target2).

Further and Other Embodiments

The handover method is also applied to CDMA systems using soft handover. In these systems, the breaking of the link between the old P-BTS and the radio interface will not occur. A bridging circuit of MCU 45 of FIG. 2 is inserted between the old P-BTS, the new P-BTS, and the remote (other) endpoint. This method is used to select the best signal from each P-BTS. Furthermore, it may be required to support multiple (more than two) P-BTSs communicating simultaneously with the mobile station. In this case, one radio link is set up with each of the se P-BTSs and the bridge is also set up so that it includes all these P-BTSs and the remote (other) endpoint.

GLOSSARY

The following abbreviations are used in the drawings:

| Ack | Acknowledge |
|---|---|
| ACM | (ISUP) Address Complete Message |
| Act. | Activation |
| ANM | (ISUP) Answer Message |
| BSS | Base Station Subsystem |
| CC | Call Control |
| Chann. | Channel |
| CI | Cell Identifier |
| CID | Call Identifier |
| Cmd | Command |

-continued

| | |
|---|---|
| Comp | Complete |
| Conn. | Connect |
| CPN | Called Party Number |
| CRV | Call Reference Value |
| CSU | Circuit Switching Unit |
| Det | Detect |
| DSP | Digital Signal Processing |
| EP | (H.323) End Point |
| Est | Establishment |
| Hand | Handover |
| HO | Handover |
| HON | Handover Number |
| IAM | (ISUP) Initial Address Message |
| IWU | Interworking Unit |
| LAC | Location Area Code |
| LUDB | Local User DataBase |
| MAP | Mobile Application Part |
| MC | (H.323) Multi-Point Control Entity |
| MCU | (H.323) Multi-Point Control Unit |
| MM | Mobility Management |
| Mob | Mobile |
| MS | Mobile Station |
| MSC | Mobile Switching Center |
| Msg. | Message |
| OAM | Operations, Administration, and Maintenance |
| PLMN | Public Land Mobile Network |
| RAS | (H.323) Registration, Administration, and Status Protocol |
| REL | (ISUP) Release Message |
| Rel. | Release |
| Req | Request |
| RF | Radio Frequency |
| RLC | (ISUP) Release Complete Message |
| RR | Radio Resource Management |
| Rsp. | Response |
| RTCP | Real-Time Transport Control Protocol |
| RTP | Real-Time Transport Protocol |
| TCAP | (SS7) Transaction Capability Application Part |
| TCH | Traffic Channel |
| TSAP | (H.323) Transport Layer Service Access Point |
| VB Link | ViperBase (Gatekeeper) Link |

While the invention has been particularly shown and described with reference to preferred embodiments thereof it will be understood by those skilled in the art that various changes in form and details may be made therein without departing from the scope of the invention.

What is claimed is:

1. A communication system comprising:
    two or more wireless networks, each of said wireless networks operating with a wireless protocol for communications with mobile stations, said wireless networks including two or more wireless cells for providing communications to said mobile stations, each of said wireless cells including a base transceiver station that defines the radio boundary of each wireless cell, each of said wireless networks including signaling, voice, and data traffic links that enable network communications with base transceiver stations,
    at least one wireless network further comprising:
        signaling, voice, and data traffic links using a wired-packet protocol,
        a connection unit that interconnects voice and data traffic links using the wired-packet protocol with the voice and data traffic links of one or more wireless networks,
        an interworking unit that interconnects signaling traffic links using the wired-packet protocol with the signaling traffic links of one or more wireless networks,
        an interface for interfacing the wireless protocol and the wired-packet protocol whereby base transceiver stations communicate with mobile stations using the wireless protocol and use the wired-packet protocol to enable handover of mobile stations from one of said wireless cells to another one of said wireless cells, and
        a controller for controlling the handover of mobile stations from one of said wireless cells to another one of said wireless cells.

2. The communication system of claim 1 wherein said wireless protocol is one of GSM, CDMA, W-CDMA and IS 136 TDMA.

3. The communication system of claim 1 wherein said wired-packet protocol is Internet Protocol.

4. The communication system of claim 1 wherein said traffic links include one or more local area networks and connect the wireless networks to said connection unit and interworking unit.

5. The communication system of claim 4 wherein said wireless networks include a public wireless network and a private wireless network and said connection unit connects the public wireless network and the private wireless network for communications by said wireless stations between the public wireless network and the private wireless network.

6. The communication system of claim 1 further comprising public networks having a public wireless network and private networks having a private wireless network, and wherein:
    one of said two or more wireless networks is said public wireless network and one of said two or more wireless networks is a private wireless network,
    said traffic links include one or more local area networks,
    said connection unit connects said local area networks of the private wireless networks to the public networks including the public wireless network, and
    said interface means interfaces the wireless protocol and the wired-packet protocol whereby base transceiver stations communicate with mobile stations using the wireless protocol and use the wired-packet protocol to enable handover of mobile stations from one of said wireless cells to another one of said wireless cells.

7. The communication system of claim 6 wherein said public network includes one or more of the Internet, PSTN, N-ISDN and B-ISDN.

8. The communication system of claim 6 wherein said traffic links connect to wired terminals via a local area network to provide integrated voice and data communications between said mobile stations and said wired terminals using said wired-packet protocol.

9. The communication system of claim 6 wherein said public wireless network includes a public BTS, a public BSC, a public MSC and a public HLR for mobile stations making calls using said public wireless network.

10. The communication system of claim 9 wherein said mobile stations do not require use of said public BTS, said public BSC, said public MSC or said public HLR for calls using said private wireless networks.

11. The communication system of claim 6 wherein said wireless networks include a plurality of private wireless networks, a plurality of private base transceiver stations, each private base transceiver station establishing wireless communication, using said wireless protocol, with said mobile stations located in one or more cells within a corresponding one of the private wireless networks, and wherein said connection unit includes a hub for connecting said plurality of private base transceiver stations together in a local area network.

12. The communication system of claim 11 including a gatekeeper connected in said local area network for providing control functions for operation of the mobile stations according to the private wired-packet protocol.

13. The communication system of claim 12 wherein said gatekeeper includes a gatekeeper database and an encoder/decoder for registration, administration and status messages.

14. The communication system of claim 11 including a router connected in said local area network for providing control functions for routing calls between the private networks and the public networks.

15. The communication system of claim 14 wherein said public network includes one or more of the Internet, PSTN, N-ISDN and B-ISDN.

16. The communication system of claim 15 wherein said connection unit includes one or more gateways for providing control functions for the mobile stations for converting the wired packet protocol to a public network protocol for said public networks.

17. The communication system of claim 1 wherein said wireless protocol is GSM and has a wireless call build/teardown sequence and said wired-packet protocol includes H.225, H.245 and H.323 and has a wired-packet call build/teardown sequence and wherein said interface means integrates said wireless call build/teardown sequence with said wired-packet call build/teardown sequence.

18. The communication system of claim 1 wherein said controller controls which ones of the wireless cells service which ones of the wireless stations.

19. The communication system of claim 18 wherein said controller is effected by the coordination of a gateway, gatekeeper, and Multi-conference unit that control handover of mobile stations from one of said wireless cells to other of said wireless cells.

20. The method of claim 19 wherein said wireless networks include a plurality of private wireless networks, a plurality of private base transceiver stations, each private base transceiver station establishing wireless communication, using said wireless protocol, with said mobile stations located in one or more cells within a corresponding one of the private wireless networks, and wherein said connection unit includes a hub for connecting said plurality of private base transceiver stations together in a local area network.

21. The method of claim 20 further comprising:
providing control functions via a gatekeeper connected in said local area network, the control functions for operation of the mobile stations according to the private wired-packet protocol.

22. The method of claim 21 wherein said gatekeeper includes a gatekeeper database and an encoder/decoder for further steps of providing registration, administration and status messages.

23. The method of claim 20 further including:
routing, via said local area network, said control functions for routing calls between the private networks and the public networks.

24. The method of claim 23 wherein said public network includes one or more of the Internet, PSTN, N-ISDN and B-ISDN.

25. The method of claim 24 wherein said connecting step further comprises:
providing one or more gatekeeper database for implementing control functions for the mobile stations for converting the wired packet protocol to a public network protocol for said public networks.

26. The communication system of claim 1 wherein said wireless networks include one or more base transceiver stations, each base transceiver station establishing wireless communication, using said wireless protocol, with said mobile stations located in a cell.

27. The communication system of claim 1 wherein said one or more wireless networks includes one or more private wireless networks, one or more of said private wireless networks having two or more private cells including a first private cell and a second private cell where mobile stations in each of said private cells are under control of private base stations for said private cells including a first private base station for said first private cell and a second private base station for said second private cell and where a handover of mobile stations from said first private cell to said second private cell is controlled by a handover from said first private base station to said second private base station using a wired-packet protocol.

28. The communication system of claim 27 wherein said first private base station and said second private base station have ports that support an RTP protocol and said handover establishes a traffic connection using said RTP protocol between said first private base station and said second private base station.

29. The communication system of claim 27 wherein said connection unit and interface enable connection of said first private base station and said second private base station and wherein said private wireless networks include one or more gatekeepers for providing control functions for the mobile stations using said wired-packet protocol.

30. The communication system of claim 29 wherein said gatekeeper includes a gatekeeper database providing wired-packet addresses.

31. The communication system of claim 27 wherein, after said handover of mobile stations from said first private cell to said second private cell, a back handover of mobile stations from said second private cell to said first private cell is controlled by a handover from said second private base station to said first private base station.

32. The communication system of claim 31 wherein said first private base station and said second private base station have ports that support an RTP protocol and said back handover breaks any traffic connection using said RTP protocol between said first private base station and said second private base station.

33. The communication system of claim 27 wherein, after said handover of mobile stations from said first private cell to said second private cell, a second handover of mobile stations from said second private cell to a third private cell is controlled by a handover from said second private base station to a third private base station.

34. The communication system of claim 33 wherein said first private base station, said second private base station and said third private base station have ports that support an RTP protocol and said second handover establishes a traffic connection using said RTP protocol between said first private base station and said third private base station and breaks any traffic connection using said RTP protocol between said first private base station and said second private base station.

35. The communication system of claim 33 wherein said connection unit and interface enable connection of said first private base station and said second private base station and wherein said private wireless networks include one or more gatekeepers for providing control functions for the mobile stations using said wired-packet protocol.

36. The communication system of claim 35 wherein said gatekeeper includes a gatekeeper database providing wired-packet addresses.

37. The communication system of claim 1 wherein said one or more wireless networks further comprises:
one or more private wireless networks, each of said private wireless networks having one or more private cells, including a first private cell, where mobile stations in said private cells are under control of private base stations for said private cells including a first private base station for said first private cell, one or more public wireless networks, each of said public wireless networks having one or more public cells including a first public cell where mobile stations in said public cells are under control of public base stations for said public cells including a first public base station for said first public cell, and where a handover of mobile stations from said first private cell to said first public cell is controlled by a handover from said first private base station to said first public base station using said wired-packet protocol.

38. The communication system of claim 37 wherein said connection unit, interworking unit, and interface enable connection of said first private base station and said first public base station and wherein said private wireless networks include one or more gatekeepers for providing control functions for the mobile stations using said wired packet protocol.

39. The communication system of claim 38 wherein said gatekeeper includes a gatekeeper database providing wired-packet addresses.

40. The communication system of claim 37 wherein, after a handover of mobile stations from said first private cell to said first public cell, a back handover from said first public cell to said first private cell is controlled by a handover from said first public base station to said first private base station.

41. The communication system of claim 37 wherein after a handover of mobile stations from said first private cell to said first public cell, a handover from said first public cell to a second public cell is controlled by a handover from said first public base station to said second public base station.

42. The communication system of claim 1 wherein said one or more wireless networks further comprises:

one or more private wireless networks, each of said private wireless networks having one or more private cells, including a first private cell, where mobile stations in said private cells are under control of private base stations for said private cells including a first private base station for said first private cell, one or more public wireless networks, each of said public wireless networks having one or more public cells including a first public cell where mobile stations in said public cells are under control of public base stations for said public cells including a first public base station for said first public cell, and wherein a handover of mobile stations from said first public cell to said first private cell is controlled by a handover from said first public base station to said first private base station using said wired-packet protocol.

43. The communication system of claim 42 wherein said connection unit, interworking unit, and interface enable connection of said first public base station and said first private base station and wherein said private wireless networks include one or more gatekeepers for providing control functions for the mobile stations using said wired packet protocol.

44. The communication system of claim 43 wherein said gatekeeper includes a gatekeeper database providing wired-packet addresses.

45. The communication system of claim 42 wherein after a handover of mobile stations from said first public cell to said first private cell, a back handover from said first private cell to said first public cell is controlled by a handover from said first private base station to said first public base station.

46. The communication system of claim 42 wherein, after a handover of mobile stations from said first public cell to said first private cell, a handover from said first private cell to a second public cell is controlled by a handover from said first private base station to said second public base station.

47. The communication system of claim 1 wherein the signaling, voice and data traffic links enable network communications directly and indirectly between base transceiver stations and any one or combination of MSCs, BSCs, HLRs, AUCs, VLRs, EIRs, interworking units, connection units, hubs, gateways, gatekeepers and routers.

48. The communications system of claim 1 wherein the interworking unit further interconnects voice and data traffic links using the wired-packet protocol with the voice and data traffic links of one or more wireless networks.

49. A method for wireless communication comprising:

providing connections to two or more wireless networks, each of said wireless networks operating with a wireless protocol for communications with mobile stations, said wireless networks including two or more wireless cells for providing communications to said mobile stations, each of said wireless cells including a base transceiver station that defines the radio boundary of each wireless cell, each of said wireless networks also including signaling, voice, and data traffic links that enable network communications with base transceiver stations, with at least one wireless network further
providing signaling, voice, and data traffic links using a wired-packet protocol,
interconnecting voice and data traffic links using the wired-packet protocol with the voice and data traffic links of one or more wireless networks,
interconnecting via an interworking unit, signaling traffic links using the wired-packet protocol with the signaling traffic links of one or more wireless networks,
interfacing the wireless protocol and the wired-packet protocol whereby base transceiver stations communicate with mobile stations using the wireless protocol and use the wired-packet protocol to enable handover of mobile stations from one of said wireless cells to another one of said wireless cells, and
controlling the handover of mobile stations from one of said wireless cells to another one of said wireless cells.

50. The method of claim 49 wherein said wireless protocol is one of GSM, CDMA, W-CDMA and IS 136 TDMA.

51. The method of claim 49 wherein said wired-packet protocol is Internet Protocol.

52. The method of claim 49 wherein said traffic links include one or more local area networks, to further implement a step of connecting the wireless networks to said connection unit and interworking unit.

53. The method of claim 52 wherein said wireless networks include a public wireless network and a private wireless network and said connecting step connects the public wireless network and the private wireless network for communications by said wireless stations between the public wireless network and the private wireless network.

54. The method of claim 49 further including public networks having a public wireless network and private networks having a private wireless network, wherein, one of said two or more wireless networks is said public wireless network and one of said two or more wireless networks is a private wireless network, and said traffic links include one or more local area networks, and further comprising:
connecting said local area networks of the private wireless networks to the public networks via the public wireless network, and
interfacing the wireless protocol and the wired-packet protocol whereby base transceiver stations communicate with mobile stations using the wireless protocol and use the wired-packet protocol to enable handover of mobile stations from one of said wireless cells to another one of said wireless cells.

55. The method of claim 54 wherein said public network includes one or more of the Internet, PSTN, N-ISDN and B-ISDN.

56. The method of claim 54 wherein said traffic links connect to wired terminals via a local area network to provide integrated voice and data communications between said mobile stations and said wired terminals using said wired-packet protocol.

57. The method of claim 54 wherein said public wireless network includes a public BTS, a public BSC, a public MSC and a public HLR for mobile stations making calls using said public wireless network.

58. The method of claim 56 wherein said mobile stations do not require use of said public BTS, said public BSC, said public MSC or said public HLR for calls using said private wireless networks.

59. The method of claim 49 wherein said wireless protocol is GSM and has a wireless call build/teardown sequence and said wired-packet protocol includes H.225, H.245 and H.323 and has a wired-packet call build/teardown sequence and wherein said interfacing stop further integrates said wireless call build/teardown sequence with said wired-packet call build/teardown sequence.

60. The method of claim 49 wherein said controlling stop controls which ones of the wireless cells service which ones of the wireless stations.

61. The method of claim 60 wherein said controlling step is effected by the coordination of a gateway, gatekeeper, and Multi-conference unit that control handover of mobile stations from one of said wireless cells to other of said wireless cells.

62. The method of claim 49 wherein said wireless networks include one or more base transceiver stations, each base transceiver station establishing wireless communication, using said wireless protocol, with said mobile stations located in a cell.

63. The method of claim 49 wherein said one or more wireless networks includes one or more private wireless networks, one or more of said private wireless networks having two or more private cells including a first private cell and a second private cell where mobile stations in each of said private cells are under control of private base stations for said private cells including a first private base station for said first private cell and a second private base station for said second private cell and further comprising:
handing over of mobile stations from said first private cell to said second private cell via a handover from said first private base station to said second private base station using a wired-packet protocol.

64. The method of claim 63 wherein said first private base station and said second private base station have ports that support an RTP protocol and said handing over step further establishes a traffic connection using said RTP protocol between said first private base station and said second private base station.

65. The method of claim 63 wherein said connection unit and interface means enable connection of said first private base station and said second private base station and wherein said private wireless networks include one or more gatekeepers for providing control functions for the mobile stations using said wired-packet protocol.

66. The method of claim 65 wherein said gatekeeper includes a gatekeeper database providing wired-packet addresses.

67. The method of claim 63 further comprises, after said step of handing over of mobile stations from said first private cell to said second private cell, a further back handing over of mobile stations from said second private cell to said first private cell controlled by handing over from said second private base station to said first private base station.

68. The method of claim 67 wherein said first private base station and said second private base station have ports that support an RTP protocol and said back handing over step further breaks any traffic connection using said RTP protocol between said first private base station and said second private base station.

69. The method of claim 63 wherein, after said step of handing over of mobile stations from said first private cell to said second private cell,
performing a second step of handing over of mobile stations from said second private cell to a third private cell, controlled by a handing over from said second private base station to a third private base station.

70. The method of claim 69 wherein said first private base station, said second private base station and said third private base station have ports that support an RTP protocol and said second step of handing over establishes a traffic connection using said RTP protocol between said first private base station and said third private base station, and breaks any traffic connection using said RTP protocol between said first private base station and said second private base station.

71. The method of claim 69 wherein said connecting step and interfacing steps enable connecting of said first private base station and said second private base station and wherein said private wireless networks include one or more gatekeepers for a further step of providing control functions for the mobile stations using said wired-packet protocol.

72. The method of claim 71 wherein said gatekeeper includes a gatekeeper database providing wired-packet addresses.

73. The method of claim 49 wherein said one or more wireless networks includes,
one or more private wireless networks, each of said private wireless networks having one or more private cells, including a first private cell, where mobile stations in said private cells are under control of private base stations for said private cells including a first private base station for said first private cell,
one or more public wireless networks, each of said public wireless networks having one or more public cells including a first public cell where mobile stations in said public cells are under control of public base stations for said public cells including a first public base station for said first public cell,
and where a step of handing over of mobile stations from said first private cell to said first public cell is controlled by handing over from said first private base station to said first public base station using said wired-packet protocol.

74. The method of claim 73 wherein said connect step, interworking step, and interface step enable connecting of said first private base station and said first public base station, and wherein said private wireless networks include one or more gatekeepers for a step of providing control functions for the mobile stations using said wired packet protocol.

75. The method of claim 74 wherein said gatekeeper includes a gatekeeper database providing wired-packet addresses.

76. The method of claim 73 wherein, after handing over of mobile stations from said first private cell to said first public cell, back handing over from said first public cell to said first private cell, by handing over from said first public base station to said first private base station.

77. The method of claim 73 wherein after handing over of mobile stations from said first private cell to said first public cell, handing over from said first public cell to a second public cell by handing over from said first public base station to said second public base station.

78. The method of claim 49 wherein said one or more wireless networks further comprises:

one or more private wireless networks, each of said private wireless networks having one or more private cells, including a first private cell, where mobile stations in said private cells are under control of private base stations for said private cells including a first private base station for said first private cell, one or more public wireless networks, each of said public wireless networks having one or more public cells including a first public cell where mobile stations in said public cells are under control of public base stations for said public cells including a first public base station for said first public cell, and where handing over of mobile stations from said first public cell to said first private cell is provided by handing over from said first public base station to said first private base station using said wired-packet protocol.

79. The method of claim 78 wherein said connecting step, interworking step, and interfacing step enable connecting of said first public base station and said first private base station and wherein said private wireless networks include one or more gatekeepers that implement a step of providing control functions for the mobile stations using said wired packet protocol.

80. The method of claim 79 wherein said gatekeeper includes a gatekeeper database providing wired-packet addresses.

81. The method of claim 78 wherein after a handing-over of mobile stations from said first public cell to said first private cell, a step of back handing over from said first private cell to said first public cell is provided by a handing over from said first private base station to said first public base station.

82. The method of claim 78 wherein, after a handing over of mobile stations from said first public cell to said first private cell, a handing over from said first private cell to a second public cell is provided by a handing over from said first private base station to said second public base station.

83. A computer program product, comprising:

a computer readable medium for storing information;

a set of computer program instructions embedded on the computer readable medium, comprising instructions for providing connections to two or more wireless networks, each of said wireless networks operating with a wireless protocol for communications with mobile stations, said wireless networks also including two or more wireless cells for providing communications to said mobile stations, each of said wireless cells including a base transceiver station that defines the radio boundary of each wireless cell, each of said wireless networks also including signaling, voice, and data traffic links that enable network communications with base transceiver stations, with computer program instructions for at least one wireless network further providing signaling, voice, and data traffic links using a wired-packet protocol, interconnecting voice and data traffic links using the wired-packet protocol with the voice and data traffic links of one or more wireless networks, interconnecting via an interworking unit, signaling traffic links using the wired-packet protocol with the signaling traffic links of one or more wireless networks, interfacing the wireless protocol and the wired-packet protocol whereby base transceiver stations communicate with mobile stations using the wireless protocol and use the wired-packet protocol to enable handover of mobile stations from one of said wireless cells to another one of said wireless cells, and controlling the handover of mobile stations from one of said wireless cells to another one of said wireless cells.

84. A communication system comprising:

two or more wireless networks, each of said wireless networks operating with a wireless protocol for communications with mobile stations, said wireless networks including two or more wireless cells for providing communications to said mobile stations, each of said wireless cells including a base transceiver station that defines the radio boundary of each wireless cell, each of said wireless networks including signaling, voice, and data traffic links that enable network communications with base transceiver stations, at least one wireless network comprising:

means for providing signaling, voice, and data traffic links using a wired-packet protocol, connection means for interconnecting the voice and data traffic links using the wired-packet protocol with the voice and data traffic links of one or more wireless networks, interworking means for interconnecting signaling traffic links using the wired-packet protocol with the signaling traffic links of one or more wireless networks, interface means for interfacing the wireless protocol and the wired-packet protocol whereby base transceiver stations communicate with mobile stations using the wireless protocol and use the wired-packet protocol to enable handover of mobile stations from one of said wireless cells to another one of said wireless cells, and controls means for controlling the handover of mobile stations from one of said wireless cells to another one of said wireless cells.

* * * * *